United States Patent [19]

Martin et al.

[11] 4,016,624
[45] Apr. 12, 1977

[54] POULTRY CUT-UP MACHINE

[75] Inventors: Eugene G. Martin, Ephrata; Harold C. Martin, Leola, both of Pa.

[73] Assignee: Victor F. Weaver, Inc., New Holland, Pa.

[22] Filed: Oct. 17, 1975

[21] Appl. No.: 623,301

[52] U.S. Cl. .................................. 17/11; 17/52
[51] Int. Cl.² ................................. A22C 21/00
[58] Field of Search ............... 17/11, 52, 57, 61

[56] References Cited

UNITED STATES PATENTS

| | | | |
|---|---|---|---|
| 2,237,203 | 4/1941 | Swanson | 17/11 |
| 3,284,846 | 11/1966 | Reeves | 17/11 |
| 3,564,644 | 2/1971 | Cannon | 17/11 |
| 3,639,945 | 2/1972 | Duncan et al. | 17/11 |
| 3,890,674 | 6/1975 | Fradin | 17/11 |
| 3,943,600 | 3/1976 | Cramer | 17/11 |
| 3,946,461 | 3/1976 | Martin | 17/11 |
| 3,950,820 | 4/1976 | Duncan et al. | 17/11 |

*Primary Examiner*—Louis G. Mancene
*Assistant Examiner*—James D. Hamilton
*Attorney, Agent, or Firm*—C. Hercus Just

[57] ABSTRACT

A machine in which eviserated dressed poultry carcasses from which leg shanks have been removed from the legs are mounted upon a conveyor by clamping member thereon which is driven to move each carcass through all separating stations of the machine to sequentially and automatically remove (1) the wing tips from the intermediate wing sections, (2) the intermediate sections from the wing stubs, (3) the wing stubs from the vertebrae (back), (4) the whole breast from the vertebrae, and (5) the thighs and legs from the vertebrae in a manner to also remove the "oyster" from the vertebrae, whereby the tail and vertebrae are removed from the machine to complete the dismemberment of the carcass into all the normal commercially available pieces.

55 Claims, 25 Drawing Figures

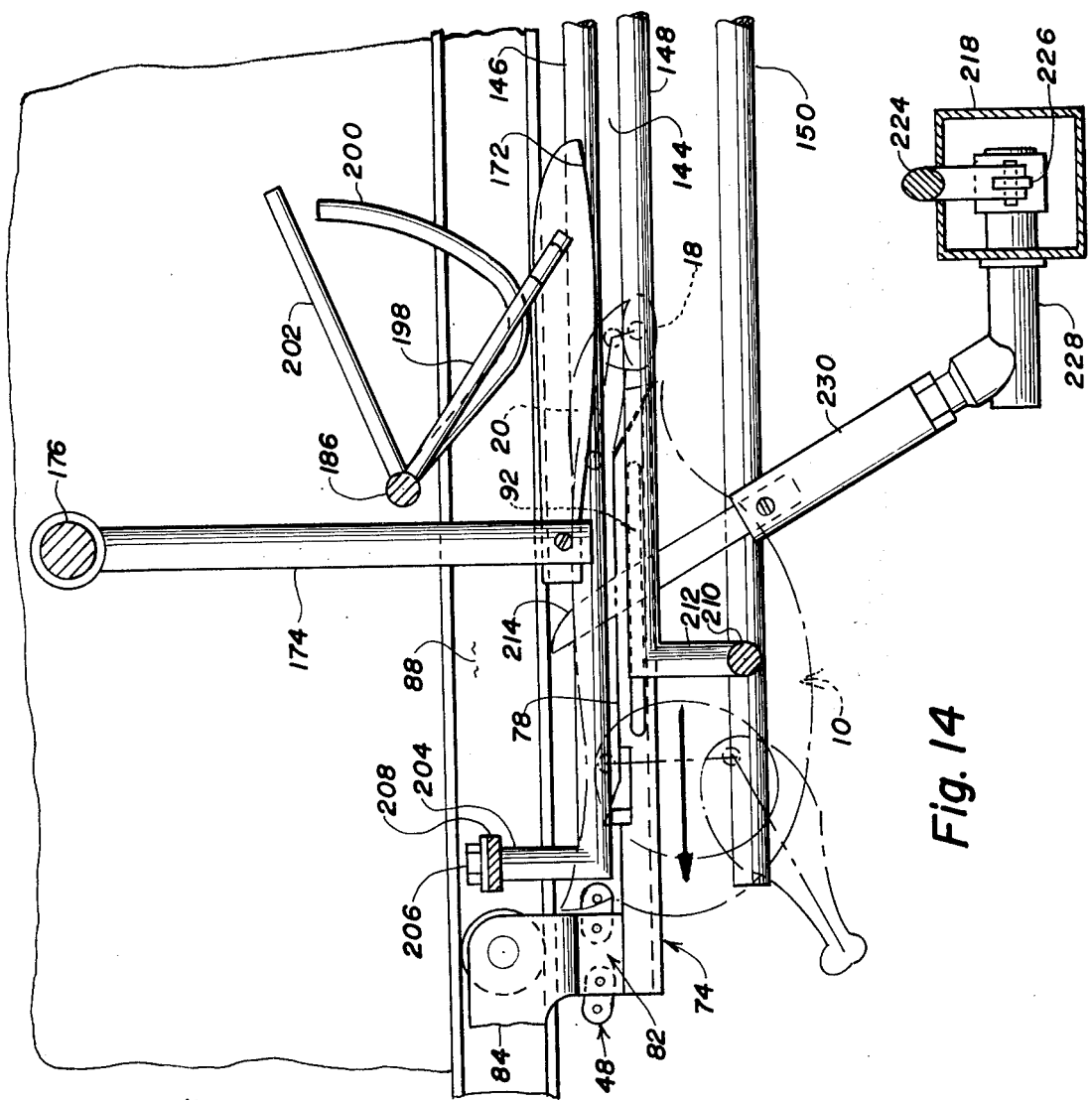
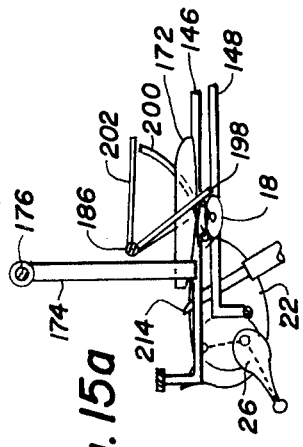
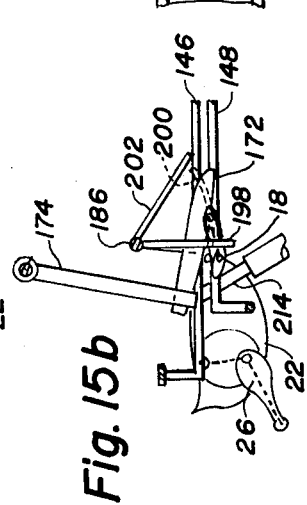
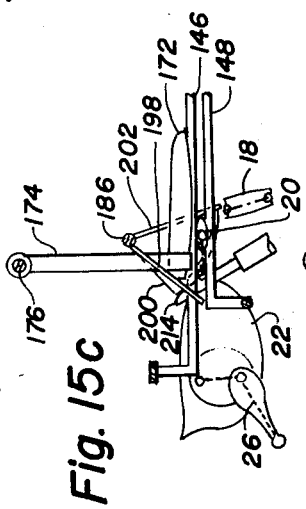
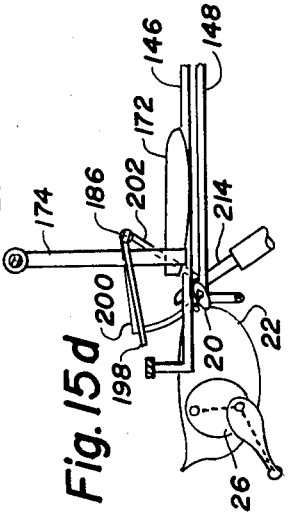

POULTRY CUT-UP MACHINE

CROSS-REFERENCE TO RELATED APPLICATION

U.S. Pat. application, Ser. No. 538,906, filed Jan. 6, 1975, now U.S. Pat. No. 3,946,461, in the name of Eugene G. Martin, one of the co-inventors of the invention of the instant application, pertains to a machine for cutting cooked poultry breasts into a plurality of sections.

BACKGROUND OF THE INVENTION

The cutting up or dismemberment of various types of poultry including chickens, pheasants, geese, ducks and similar fowls originally was a hand operation. Due to labor costs however, as well as the need to increase the production rate due to ever increasing demand for the consumption of poultry by the public, the development of machines to accomplish various types of dismemberment has been undertaken in recent years. A number of relatively simple machines which accomplish only a limited type of dismemberment are disclosed in the following patents.

| 2,237,203 | L. L. Swanson | April 1, 1941 |
| 2,941,238 | W. D. Reeves | June 21, 1960 |
| 2,957,198 | L. F. Cianciolo | Oct. 25, 1960 |
| 3,662,430 | E. J. Lloyd et al | May 16, 1972 |

Machines of the foregoing type primarily are utilized respectively to perform such individual operations as split poultry carcasses in half along the vertebrae, separate the vertebrae from the breasts and cut the breasts into a plurality of parts, cut thighs from the backbone, separate legs or drumsticks from the thighs, and cut the wings from the vertebrae. Certain types of hand manipulations and handling are neccesitated in the operation of these machines.

More recently, the need to further increase the speed of operation as well as automate the dismemberment operations so as to minimize the employment of personnel and thereby reduce overhead cost has lead to the development of a number of machines which are more automatic in nature then those listed above. Typical examples of such automated or semiautomated types of machines as follows.

| 2,807,046 | Hebenheimer | Sept. 24, 1957 |
| 3,624,863 | Gasbarro | Dec. 7, 1971 |
| 3,639,945 | Duncan | Feb. 8, 1972 |
| 3,675,272 | Schacht | July 11, 1972 |
| 3,731,344 | Phares | May, 8, 1973 |
| 3,787,926 | Schacht | Jan. 29, 1974 |

In the foregoing types of machines which are automated to various degrees, the severing and cutting of the various components of poultry carcasses is accomplished by such means as rotary knives, rotary saws, and pivoted blades or knives. The use of such means to sever the various poultry members particularly at joints and especially where ball and socket joints are involved, results in pieces of loose bone being cut from said joints, as well as bone fragments resulting from sawing are produced and no particular means is employed to attempt to remove such pieces and chips from the severed pieces of poultry. Thus, when such poultry is eaten, such pieces and chips of bone are encountered and this is objectionable.

Another situation existing in regard to a number of the previously developed cut-up machines comprises the nature of a number of the cutting discs, rotary saws and the like, certain of which are exposed and in accordance with the present safety standards enforced in accordance with government regulations at present, greater insurance against hazards to operators must be employed in dismemberment and cut-up machines of the type referred to.

SUMMARY OF THE INVENTION

It is the principal object of the present invention to provide a machine in which eviserated, dressed poultry carcasses are introduced tail foremost onto a conveyor which includes means for positively clamping the backs of the poultry carcasses onto a rigid member on the conveyor so that the carcass is held firmly during successive dismemberment operations, the operation being automatic after each carcass is mounted upon the conveyor, whereby complete safety is provided for the operator and only a single operator is required for purposes of mounting the carcasses upon said conveyor.

It is another object of the invention to provide various types of guide means relative to said aforementioned conveyor for purposes of initially extending the wings of the carcasses for successive engagement by severing means which first cut the tips of the wings from the intermediate wing sections, followed by severing the intermediate sections from the wing stubs, and lastly, providing cutting means which sever certain tendons of the wing adjacent the ball and socket joint by which the wing stub is connected to the carcass and providing additional means by which the ball of said joint on the wing is popped from the socket of the carcass without severing the bone.

It is a further object of the invention to provide a plurality of different types of knives and other dismemberment means and include automatically operated actuating mechanism by which certain of said knives are moved to and from operative positions in order to permit passage of the carcass along the path of operation in the machine and then either restore the knives to operative position or project and retract the same to effect a cutting operation, as required and explained in detail hereinafter.

It is still another object of the invention to provide the aforementioned conveyor with a series of rigid supporting members onto which the carcasses are clamped automatically immediately upon movement of the carcasses from the inlet end of the machine, said rigid members being connected to lengths of flexible chain of equal length which permit the conveyor to be flexible and thus pass around a drive sprocket, idler sprocket, and tensioning means in a manner to maintain the conveyor substantially taut.

One further object of the invention ancillary to the immediate foregoing object is to provide said rigid members on said conveyor and the clamping means associated therewith with a pair of parallel slots spaced apart transversely a distance substantially equal to the width of the vertebrae of the carcass, and provide a pair of substantially parallel knives which are actuated transversely to the axis of said conveyor and extend through said slots in order to effect severing of the whole breast from the vertebrae of the carcass.

One other object of the invention is to provide drive means for the conveyor which advances the conveyor and poultry carcasses thereon step-wise in order that most of the dismemberment occurs while the carcass is stationary in order to permit operation of knive means to effect desired dismemberment functions.

One other object ancillary to the immediate foregoing object is to provide means operated automatically to kick the breast downward for discharge from the machine following severance thereof from the vertebrae.

Still another object of the invention is to provide additional tendon-severing knive means positioned in the machine to be operative following the removal of the breast from the vertebrae for purposes of severing certain tendons on each thigh which connects it to the vertebrae adjacent the ball and socket joint by which the thighs are connected to the vertebrae, in conjunction with providing means to engage the outer tip ends of the legs and extend the same outward and upward and halt the movement of the connected legs and thighs while the conveyor moves the vertebrae and tail forwardly in the machine and thereby (1) pops the ball joints of the thighs from the sockets in the vertebrae and, in addition, tears the thighs from the vertebrae in a manner to pull the "oyster" which is integral with the thigh from its connection to the vertebrae and thereby effectively and automatically remove said "oyster" from the vertebrae for inclusion with said thighs.

Still another object of the invention is to provide means to positively eject from the machine the vertebrae and tails from which all other members of the carcass have been removed sequentially by the aforementioned dis-membering means.

One further object of the invention is to provide operated cylinders to actuate all movable members of the machine by pneumatic means except one cylinder which effects the stepwise drive of the conveyor, the latter cylinder being hydraulically operated in order to provide smooth advancing speed for the conveyor. However, most if not all of the movable members are susceptible of being operated by electrical or other mechanical means equivalent to said fluid operated means.

One further object of the invention is to provide an indexing disc associated with the conveyor in order to insure even cycling of the conveyor and the dismemberment means associated therewith, a one-way clutch also being included in association with a drive sprocket for the conveyor to insure only forward movement thereof.

Another object of the invention is to provide cam means mounted upon a cam shaft driven at a pre-determined speed for purposes of operating valves supplying pneumatic fluid to the drive cylinders for the various movable elements of the machine, said cams mounted on said shaft being driven by one of the shafts upon which the sprocket means for the conveyor is mounted.

A further object of the invention is to provide safety switches adjacent the inlet end of the machine, operation of which is necessitated by both hands of the operator after mounting a carcass upon the rigid support member of the conveyor and thereby initiate forward, step-wise movement of the conveyor by automatic means while the operator's hands are in a safe position.

Still another object of the invention is to provide a process for dis-membering poultry carcasses by a minimum of actual cutting of bone or cartilage and effect the separation of at least the major components of the poultry carcasses by severing tendons adjacent the ball and socket joints and pivoting certain of said members in a manner to pop the ball joint from its socket and thereby effect separation of the member upon which the ball joint is located from the socket therefor without cutting or otherwise chipping the bone of the ball and socket joint.

Still another object ancillary to the immediate foregoing object is to include in the process means by which the thigh and leg connected thereto is pulled from the vertebrae by a tearing action, especially for purposes of pulling the "oyster" from its slight cavity in the vertebra in order to remove the same from the vertebra for inclusion with the thigh.

Details of the foregoing objects and of the invention, as well as other objects thereof, are set forth hereinafter and are illustrated in the accompanying drawings comprising a part of the application.

DETAILED DESCRIPTION OF THE DRAWINGS

FIG. 1 is a top plan horizontal of the entire machine embodying the present invention shown with the top enclosing housing of the machine removed.

FIG. 2 is a diagrammatical view showing progressive dismemberment illustrations of the components of a carcass as the same are separated from the initial carcass and terminating with the vertebra and tail bone from which all other components have been removed, the location of each dismemberment being substantially in vertical alignment with the individual separating elements of the machine shown thereabove in FIG. 1.

FIG. 4 is a vertical sectional elevation of the entire machine shown in FIG. 1 as seen on the line 4—4 thereof.

FIG. 5 is an enlarged fragmentary side elevation showing the drive mechanism for the conveyor as seen on the line 5—5 of FIG. 1.

FIG. 14 is a vertical sectional elevation of the mechanism shown in FIG. 13, as seen on the line 13—13 thereof.

Figure 13:
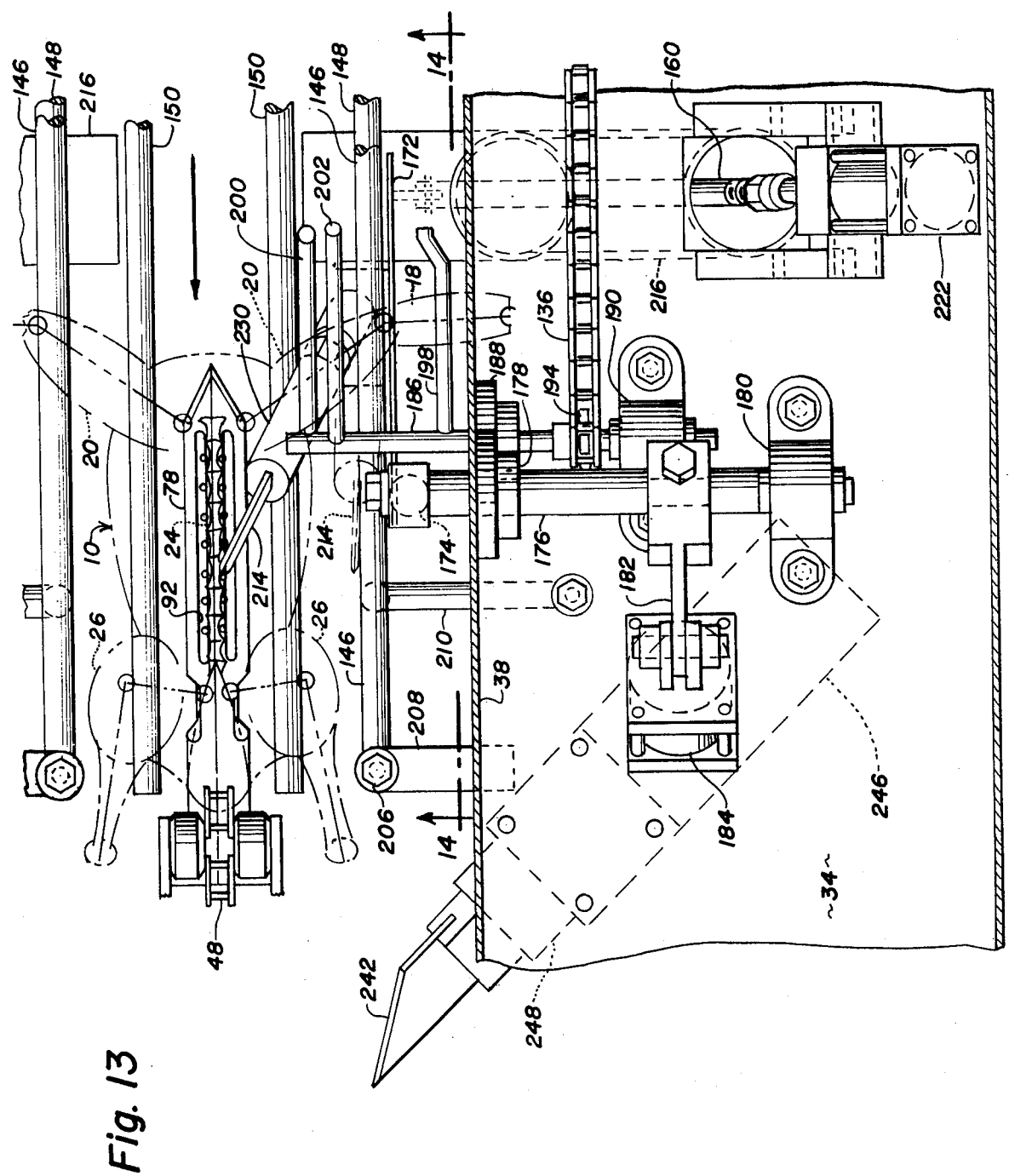
FIG. 13 is an enlarged fragmentary horizontal view showing a partial plan view of severing mechanism by which the wing sections are separated from wing stubs, said view also illustrating the method and means by which the wing stubs are separated from the vertebrae, as seen on the line 13—13 of FIG. 4.

FIGS. 15a, 15b, 15c and 15d are respectively a series of diagrammatic figures showing side views of the progressive steps performed by mechanism shown in FIGS. 13 and 14 to effect such separation of the various elements of the wings of a poultry carcass by details of the mechanism shown in FIGS. 13 and 14.

Figure 1:
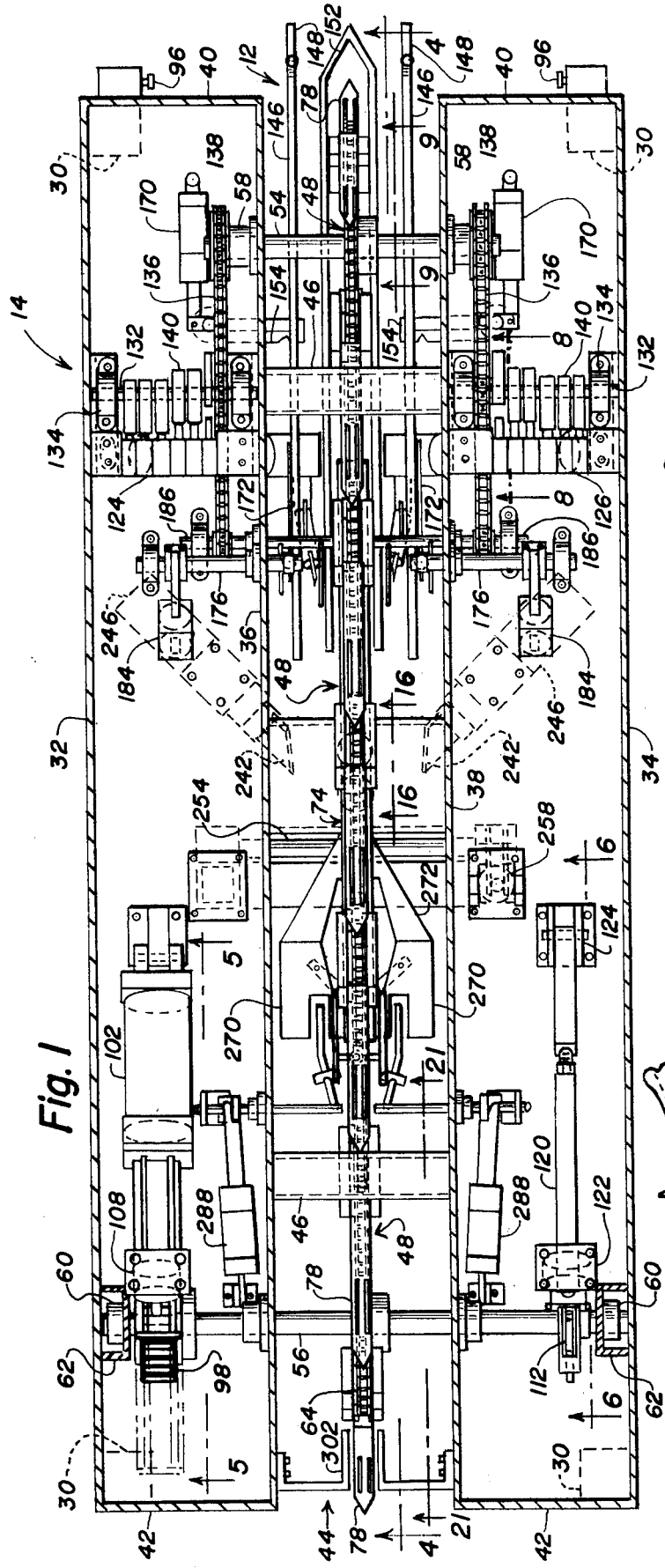
Figure 16:
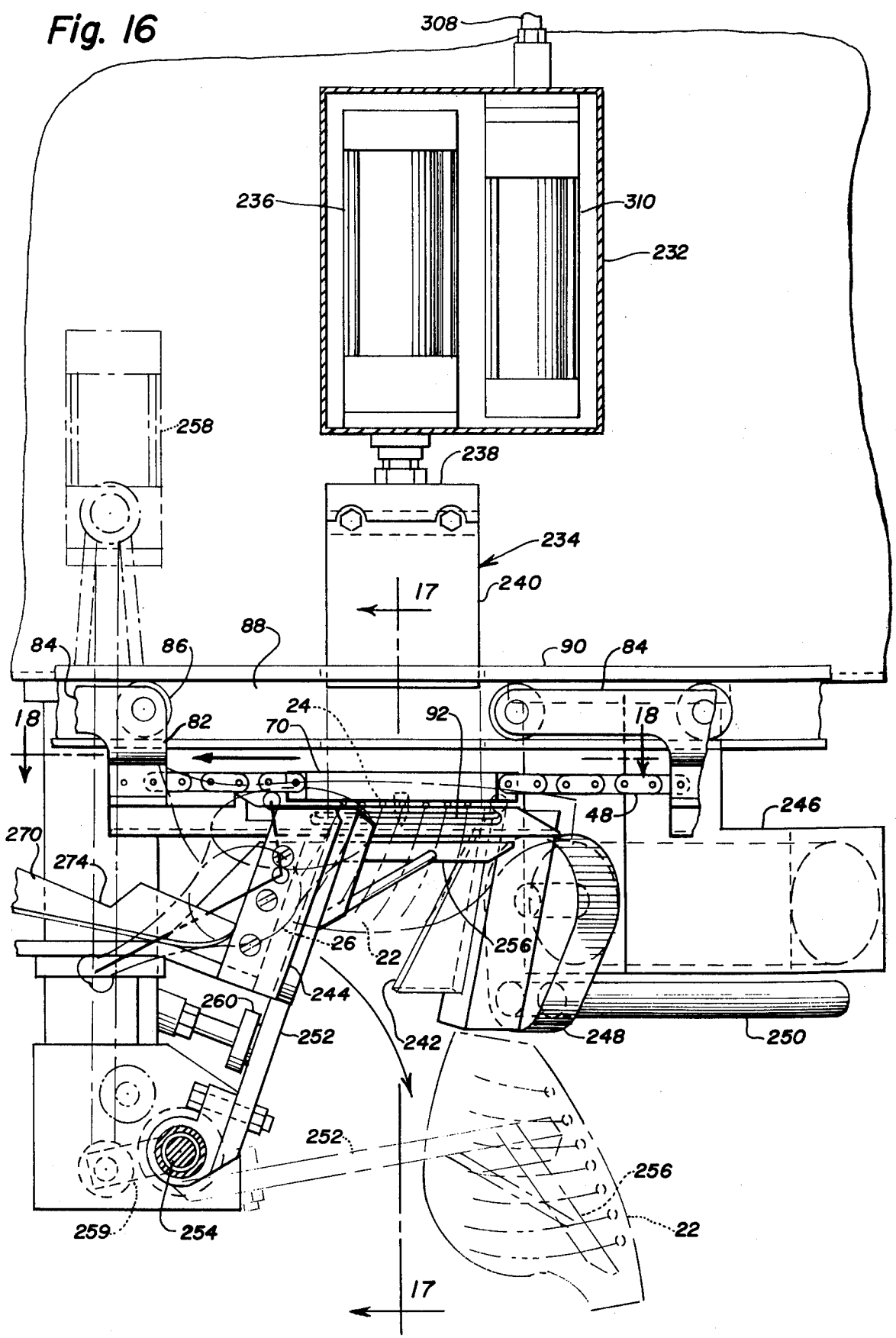

FIG. 16 is an enlarged fragmentary side elevation of means to sever the breast from the vertebrae and thighs of carcasses, as seen on the line 16—16 of FIG. 1.

Figure 17:
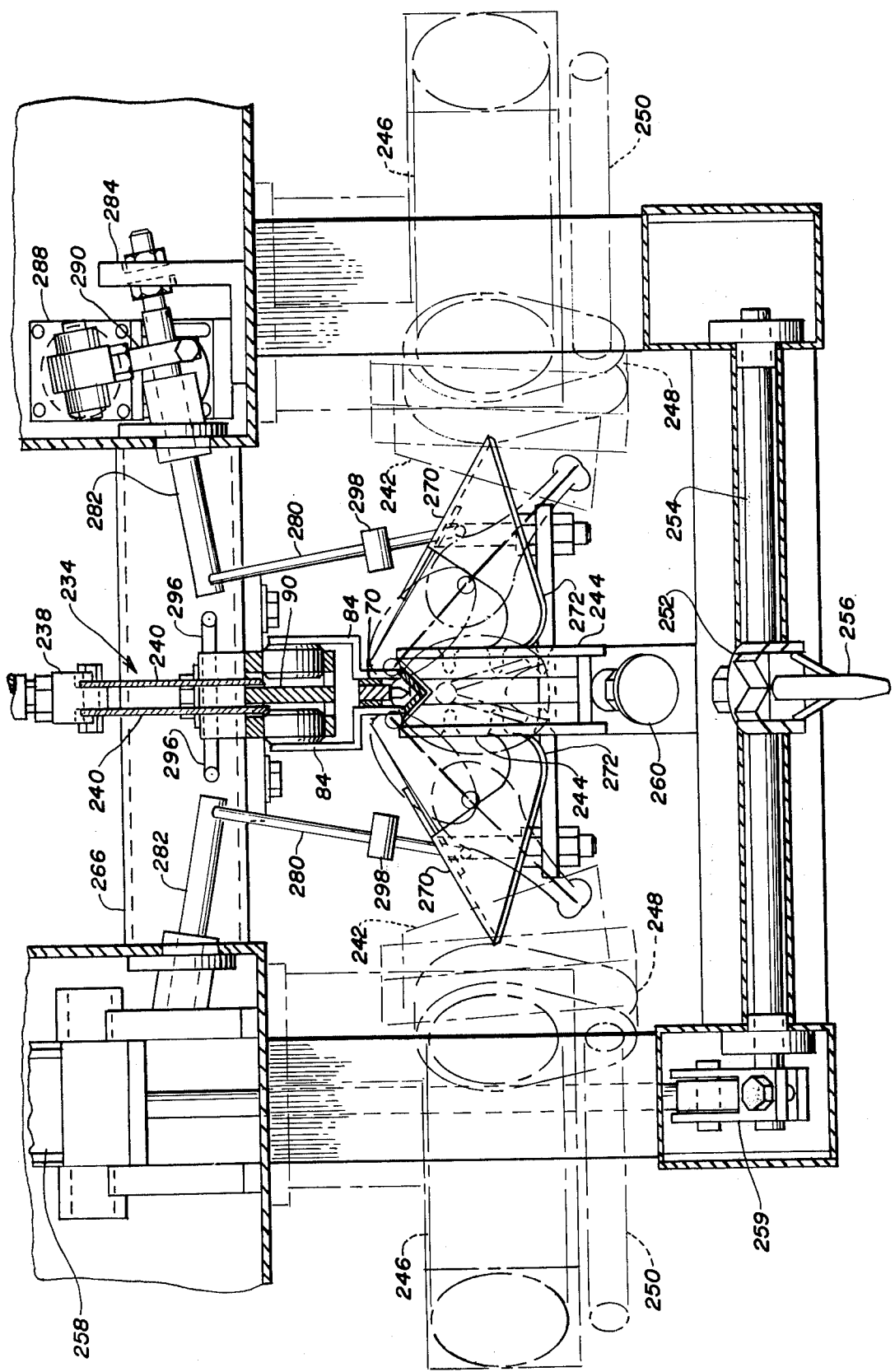

FIG. 17 is a vertical sectional view of the mechanism shown in FIG. 16, as seen on the line 17—17 of said figure.

Figure 18:
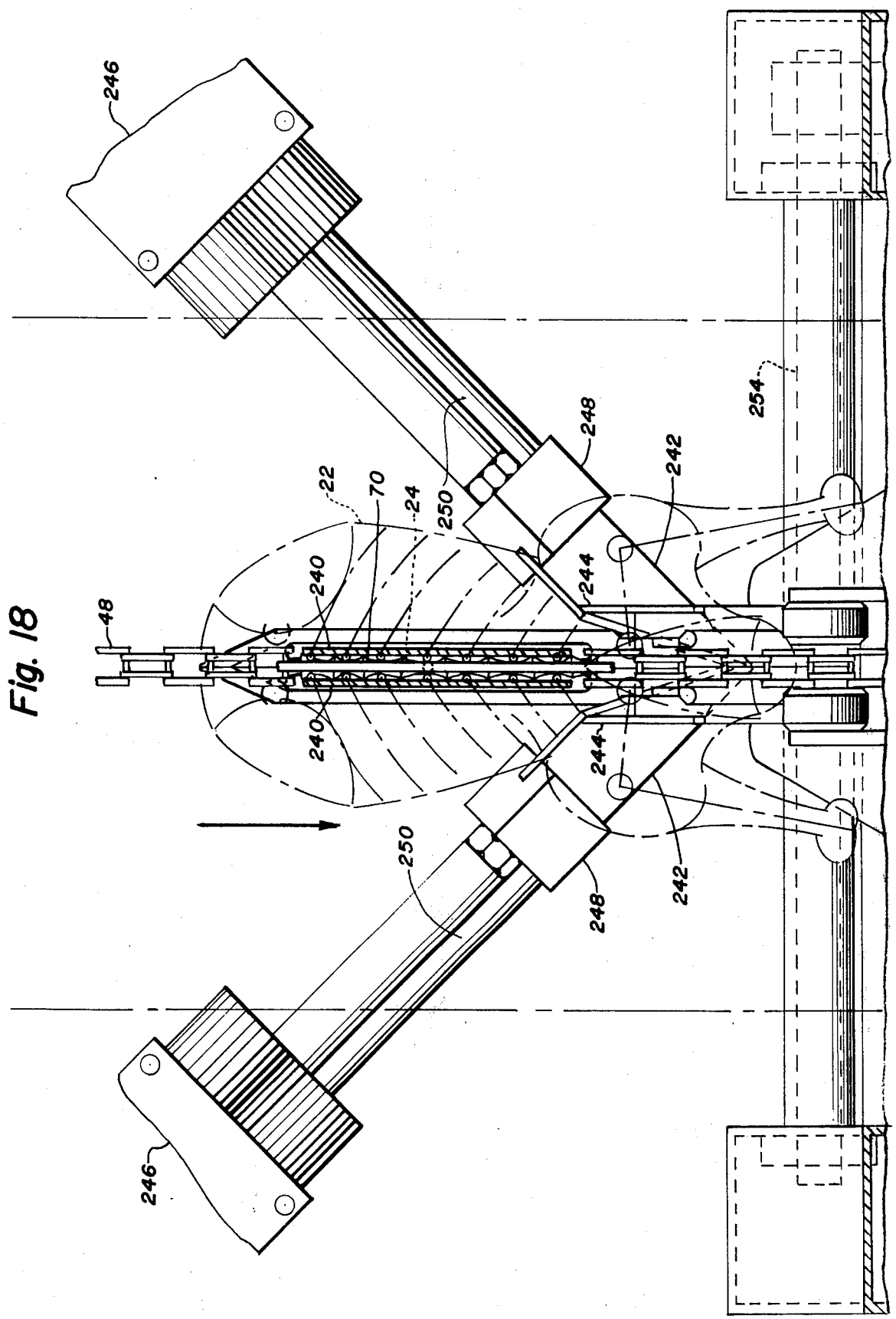

FIG. 18 is a fragmentary horizontal view of the mechanism shown in FIGS. 16 and 17, as seen on the line 18—18 of FIG. 16.

Figure 19:
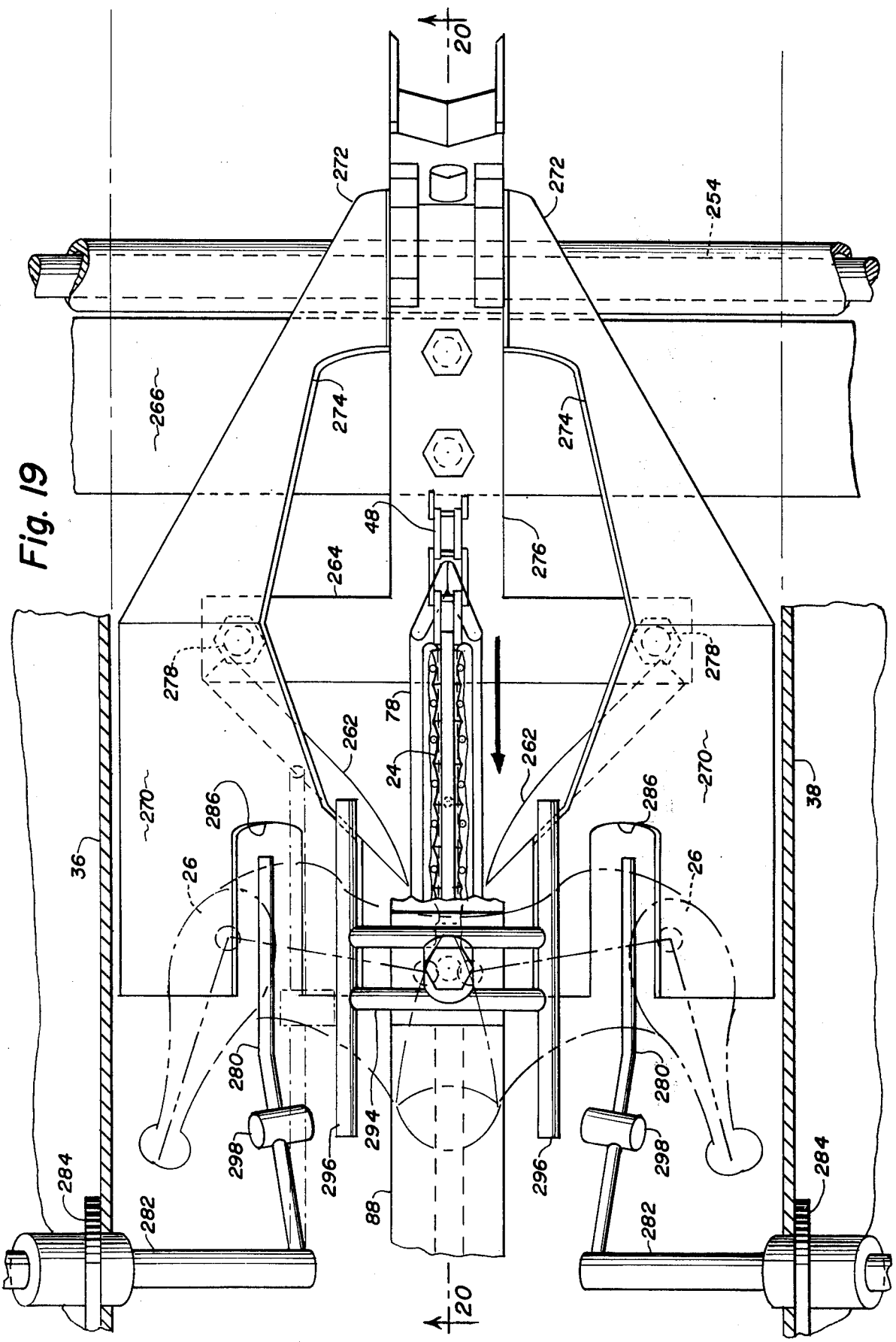

FIG. 19 is a fragmentary horizontal view of the mechanism which elevates and removes the connected legs and thighs from the vertebra of each carcass, as seen on the line 19—19 of FIG. 4.

Figure 20:
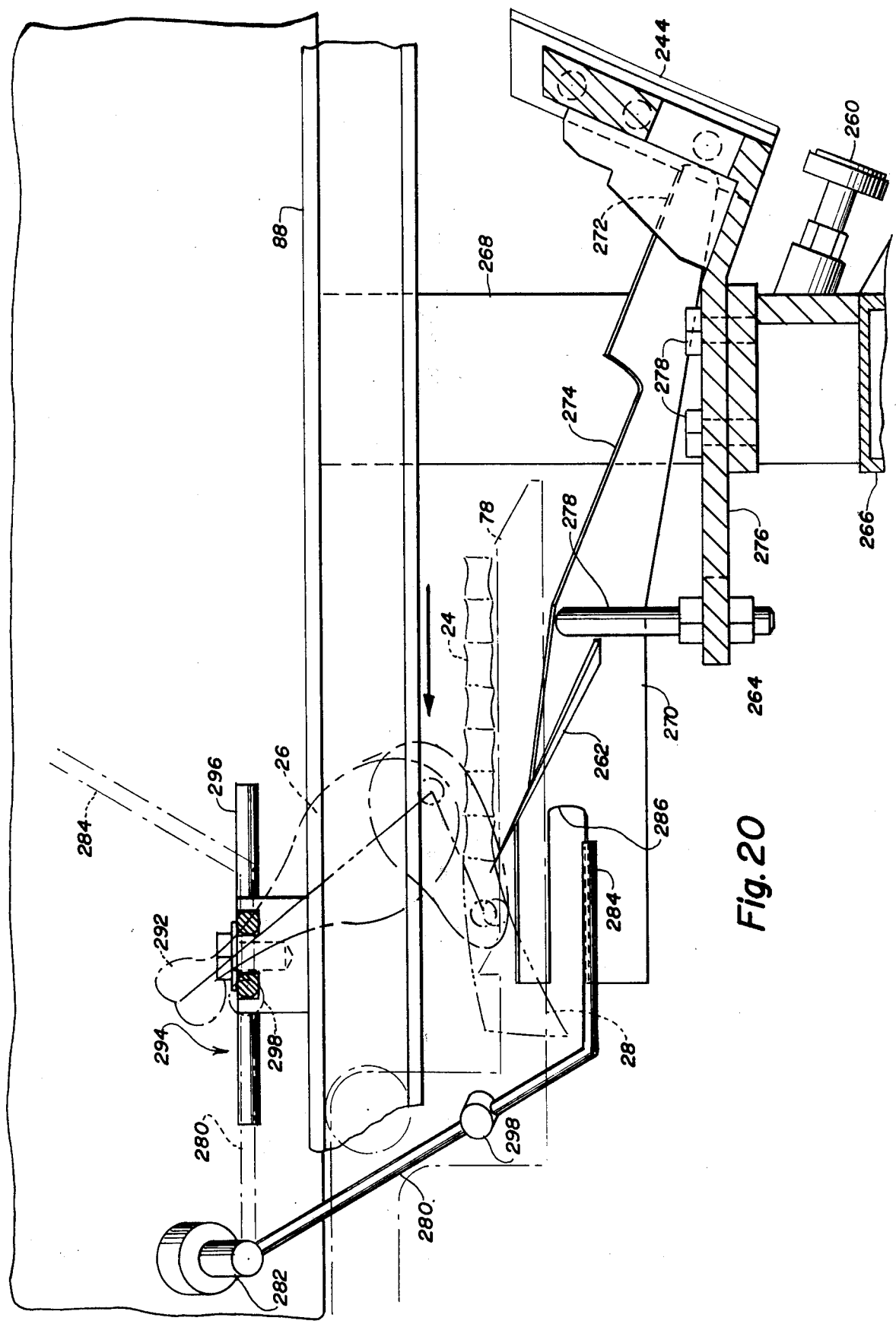

FIG. 20 is a vertical sectional view of the mechanism shown in FIG. 19, as seen on the line 20—20 thereof.

Figure 21:
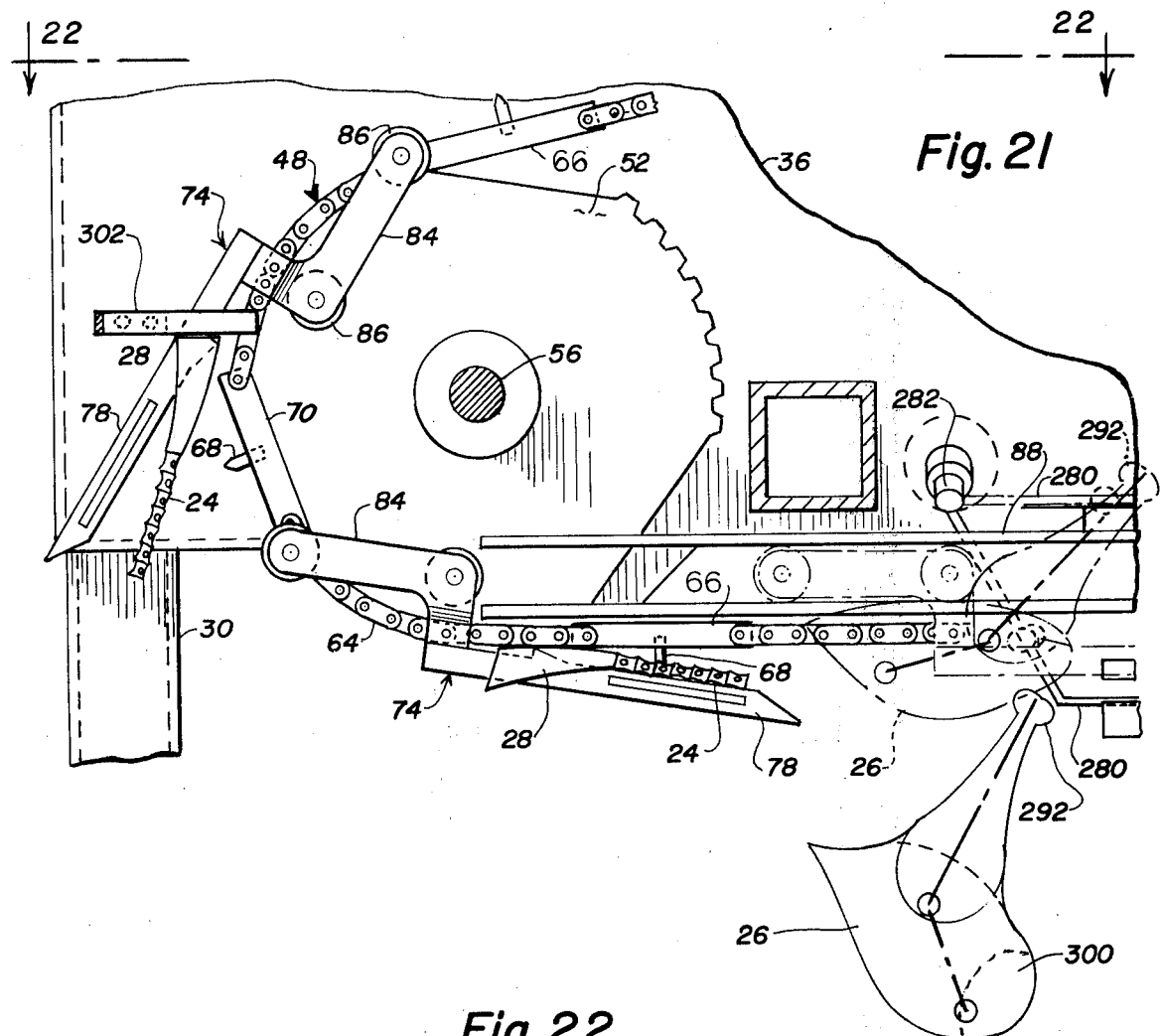

FIG. 21 is a fragmentary side elevation of the final removal mechanism in the machine which separates each vertebra and tail bone from the conveyor as the same reaches the discharge end of the machine, after all other components of the carcass have been removed therefrom, as seen on the line 21—21 of FIG. 1.

Figure 22:
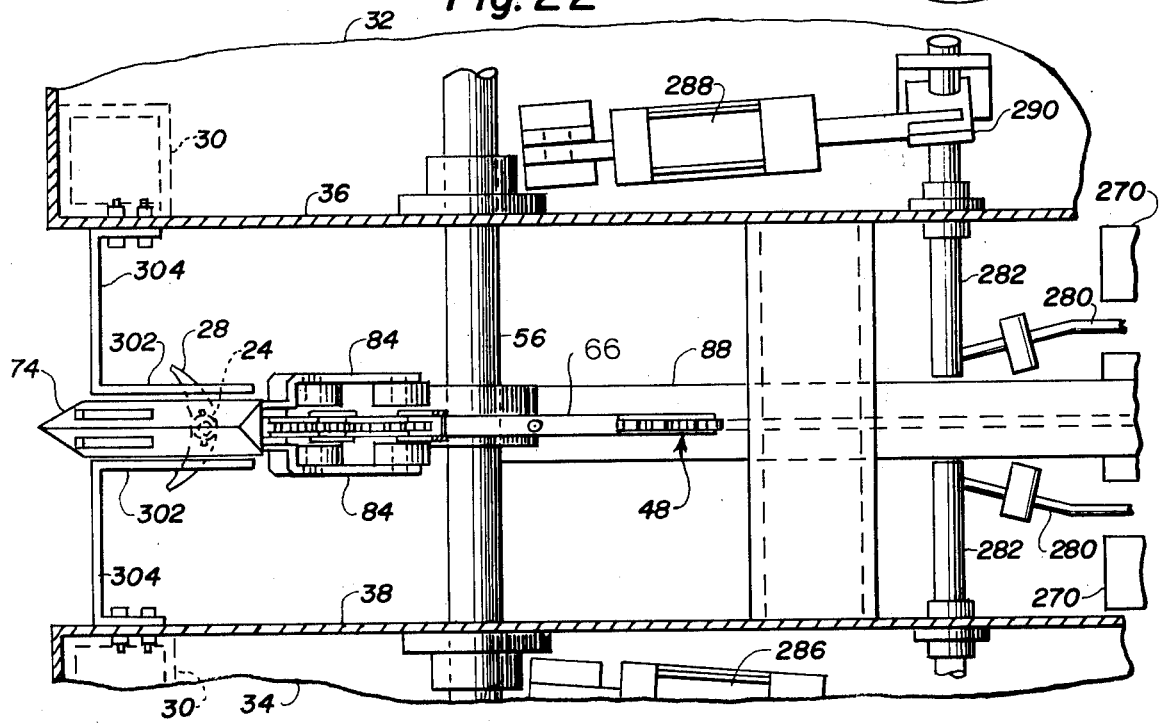

FIG. 22 is a fragmentary top plan view of the mechanism shown in FIG. 21, as seen on the line 22—22 thereof.

DETAILED DESCRIPTION

The machine comprising the present invention has been designed to effect the dismemberment of the principal commercial components of poultry carcasses, automatically, from each other and ultimately from the vertebra and tail bone of the carcass. While the machine illustrated and described herein is particularly adapted to effect the dismemberment of the carcasses of chickens, it is to be understood that with very little adjustment and rearrangement, if any, the principles and mechanism of the machine are capable of effecting dismemberment of various types of poultry including, in addition to chickens, pheasants, geese, ducks, and turkeys, especially turkeys of the smaller sizes, and similar fowls, to replace previously used dismemberment operations which largely included hand-feeding of carcasses or components thereof to various machines, or entirely dismembering such carcasses by hand operations.

Figure 2:
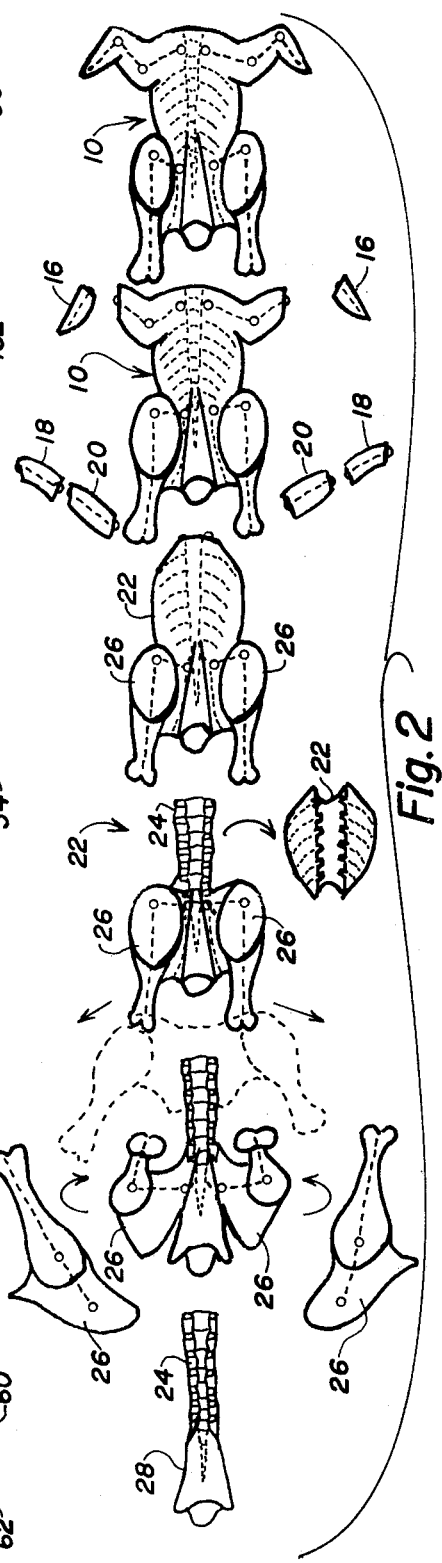

For purposes of illustrating effectively and somewhat at a glance the dismemberment which is capable of being achieved by the machine comprising the present invention, attention is directed to FIG. 2 in which, at the right hand end thereof, as viewed in said figure, the dressed poultry carcass 10 is illustrated immediately beneath the loading or inlet end 12 of the machine 14 shown in FIG. 1. It will be seen that the carcass 10 has been eviscerated and the leg shanks have been removed from the legs or drumsticks. Similarly, the neck has been removed, whereby the carcass is prepared for separation into its conventional, commercial components comprising wing tips 16, wing sections 18 which are the intermediate wing members between the tips and wing stubs 20, the entire breast 22 which includes both halves thereof as clearly shown mid-way of FIG. 2 as being separated from the saddle 22 which comprises the vertebra 24 to which the leg and thigh units 26 are still connected but, as illustrated near the left hand end of FIG. 2, said units 26 have been separated from the vertebra 24 and tailbone 28. Therefor, for purposes of the following description, the aforementioned mentioned individual components of the poultry carcass 10 which are described above and illustrated in FIG. 2 are intended to comprise the aforementioned commercial elements or pieces of a poultry carcass which is dismembered by the machine comprising the present invention.

As indicated hereinabove, relative to the description of the figures, the various operations diagrammatically illustrated in FIG. 2 respectively are substantially in alignment, in a transverse direction to the longitudinal axis of the machine 14 shown in FIG. 1 with the various dismemberment mechanisms and the stations shown in FIG. 1. However, in order to render the illustration in FIG. 1 relatively clear without unduly complicating said figure, various details of the mechanisms are not included but are illustrated in various subsequent figures of the drawing, wherein the details of said individual mechanisms are fully shown and are described hereinafter.

The machine 14 is self-contained and comprises a basic frame which, for convenience, includes a plurality of vertical legs 30 which extend to a floor, for example and, at the upper ends thereof, support elongated, longitudinal housings 32 and 34 within which much of the operating mechanism for the machine is enclosed for both safety and sanitary purposes. The interior walls 36 and 38 of the housings 32 and 34, shown in FIG. 1, support various bearings for a number of different shafts, described in detail hereinafter, whereby the basic frame arrangement of the machine is relatively simple. It also is to be understood that the housings 32 and 34 have front walls 40 which are adjacent the loading or inlet end 12 of the machine, and rear walls 42 which are adjacent the exit or discharge end 44. Various cross members 46, which are shown in cross section in FIG. 4 also comprise part of the basic frame of the machine.

The machine includes an articulated conveyor 48 which extends around a forward sprocket disc 50 and a rearward sprocket disc 52, the contours of which are best shown in FIG. 4. Said discs respectively are fixed to and supported by transverse shafts 54 and 56. As seen in FIG. 1, the forward shaft 54 is supported adjacent opposite ends within bearings 58 respectively fixed to the inner surfaces of the interior walls 36 and 38 as shown in FIG. 1. Rearward shaft 56 is supported in bearings 60 respectively carried by vertical frame members 62 which are connected to the inner surfaces of the outer panels of elongated housings 32 and 34, as also shown in FIG. 1.

DETAILS OF CONVEYOR

The conveyor 48 is composed of alternately articulated sections 64 of sprocket chain, between the opposite ends of which successive sections of chain narrow, rigid clamping members 66 are interposed, the ends of said members 66 being connected to chain by appropriate pins or rivets. Each clamping member 66 also is provided with an outwardly projecting pin 68 which is projected into the upper surface of the vertebra of each carcass incident to the same being introduced to the conveyor for attachment thereto in order that the carcasses may be positively fed through the machine, details of which are described hereinafter.

In order that the forward and rearward sprocket discs 50 and 52 may accommodate both the rigid, elongated clamping member 66 and the flexible chain sections 64, it will be seen that the periphery of each sprocket disc or member includes short straight sections 70 and arcuate toothed sections 72.

Figure 9:
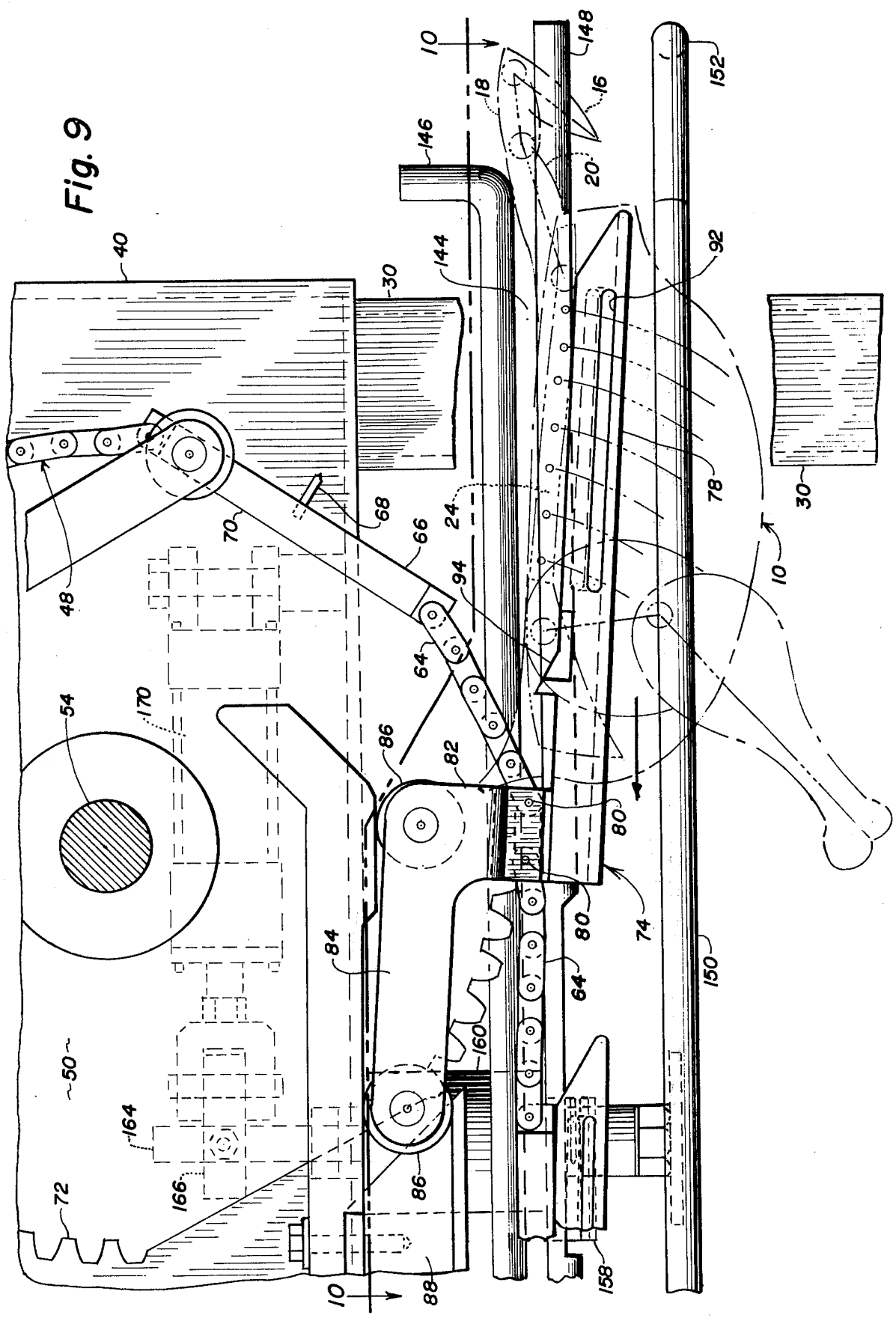
FIG. 9 is an enlarged fragmentary side elevation of the conveyor of the machine and carcass supporting mechanism associated therewith as seen on the line 9—9 of FIG. 1.
Figure 10:
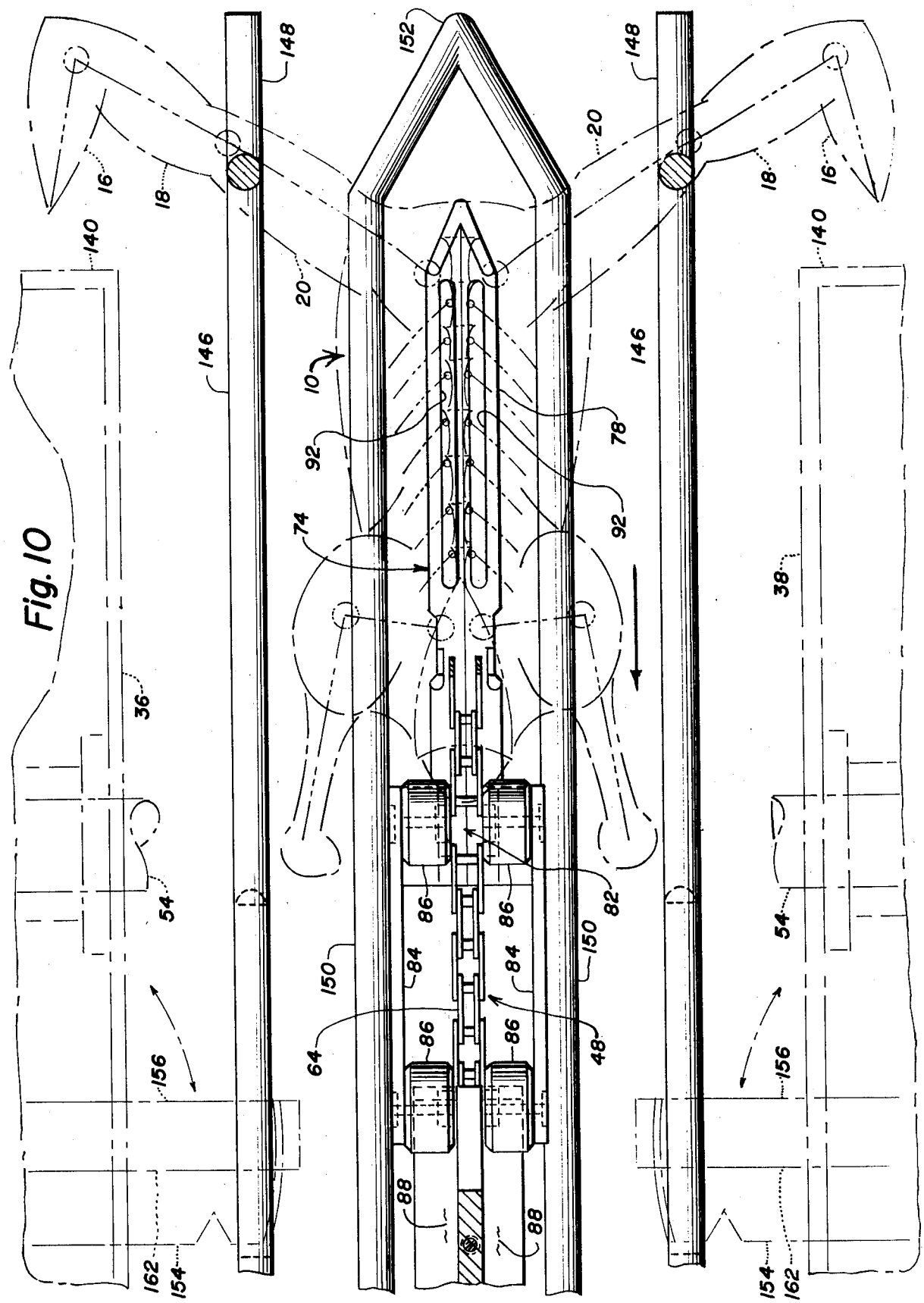
FIG. 10 is a horizontal sectional view of the mechanism shown in FIG. 9, as seen on the line 9—9 thereof.
Figure 12:
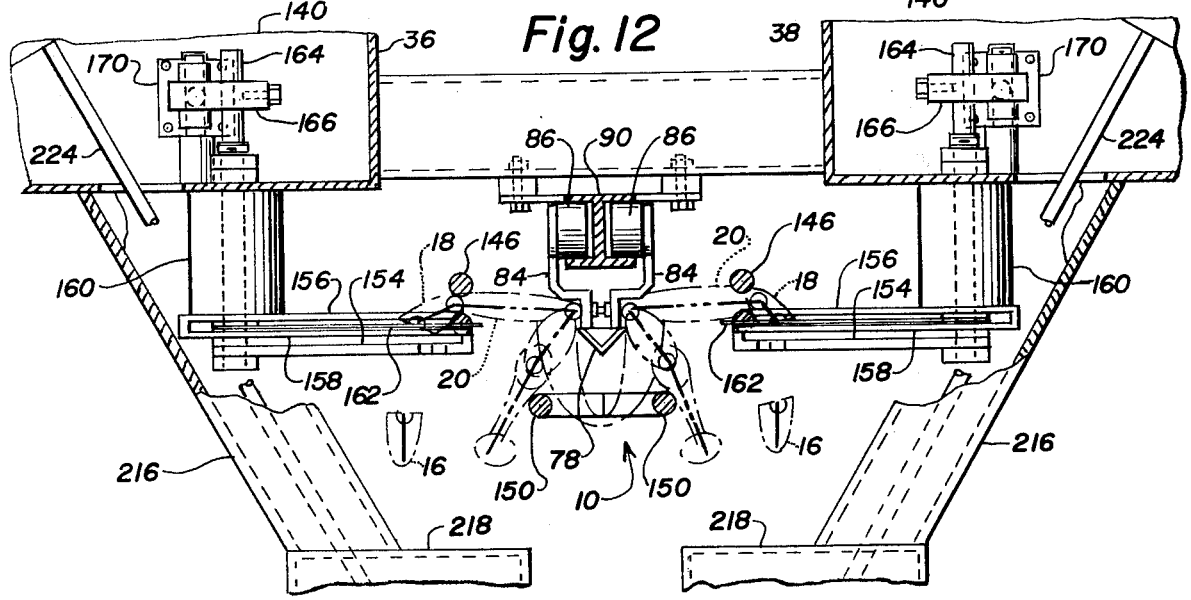
FIG. 12 is an end view of the mechanism shown in FIG. 11, as seen on the line 12—12 of said figure.

Conveyor 48 also supports a series of similar carcass supporting members 74, details of which are best shown in FIGS. 9 and 10 in enlarged manner. The conveyor 48 moves in clockwise direction as viewed in FIG. 4 and, correspondingly, each of the sprocket discs 50 and 52 move in clockwise direction, whereby the lower span 76 of the conveyor moves to the left as viewed in FIG. 4. Similarly, the fragmentary portion of the conveyor 48 shown in FIG. 9 moves in a similar clockwise direction, as does the sprocket disc 50 in said figure. Each supporting member 74 has a trailing end 78 which is spear-like and the same extends in cantilever manner from the mid-portion thereof which is connected to each of the sprocket chain sections 64. Actually, in the preferred construction, the chain sections 64 are interrupted intermediately of the ends thereof, as shown in FIG. 9, and the interrupted ends thereof are respectively connected by pins 80 to the mid portion 82 of each of the members 74. Said mid-portions 82 of each of the members 74 are U-shaped in cross section to provide a pair of forwardly extending legs 84 which are transversely spaced apart at opposite ends of said pairs of legs 84, respectively support on the inner surfaces thereof, as shown in FIG. 10, pairs of longitudinally spaced anti-friction rollers 86 which respectively are received within longitudinally extending guide channels 88, as also shown in FIG. 12. From FIG. 12, it also will be seen that the guide channels comprise the opposite sides of an I-beam 90 which extends longitudinal of the machine, between the forward and rearward sprocket discs 50 and 52 and accurately controls the movement of the lower span of the conveyor 48 and also firmly controls the movement of the trailing spear-like ends 78 of the supporting members 74, for the purpose now to be described.

The trailing, spear-like end 78 of the supporting members 74 are relatively narrow, as can be seen particularly from FIGS. 11 and 12 and the same are also provided with a pair of parallel slots 92, for purposes to be described hereinafter. Said spear-like ends are inserted within the cavity of the carcasses, which are introduced rearend foremost onto the trailing ends 78, so that the carcasses preferably extend along the ends 78 substantially for the full length of the carcasses as can be seen from FIG. 9 in which the carcass 10, shown in phantom, is mounted upon one of the spear-like ends 78. Further, as also can be seen from said figure, the upper surface of the spear-like end 78, adjacent the forward end thereof, is provided with an upwardly extending projection 94, clearly shown in FIG. 9, which extends into the kidney cavity on the inner surface of the vertebra 24 which also is shown in phantom in FIG. 9. This arrangement further assists in positively locking the carcass and especially the vertebra thereof securely in clamped relationship upon the spear-like end 78 so as to positively carry the carcass in the manner described hereinafter with respect to each of the dismembering mechanisms and units of the machine.

The clamping of the carcasses to the spear-like ends 78 is accomplished by initially mounting the carcasses upon the ends 78 in the manner described above, as illustrated in FIG. 9 and also as can be visualized from FIG. 4 in which, at the right hand end of the lower span of the conveyor 48, it will be seen that one of the ends 78 projects forwardly, in ready position to have a carcass mounted thereon, rear end foremost and back uppermost, with the legs and breasts depending in saddle-like manner downwardly on opposite sides of the members 78. At the time such carcasses are mounted upon the ends 78 of the supporting members 74, the conveyor is stationary. This is because the preferred driving mechanism for the conveyor, which is described hereinafter, actuates the same step-wise in order that when certain of the dismembering operations occur, the carcasses will be stationary to receive the cutting and other types of severing operations performed by the machine as described hereinafter. The mounting of the carcasses upon the spear-like member 78 is performed manually by an operator and when the carcass has been fully extended onto the end 78 of said supporting member, the operator then must remove his or her hands and respectively engage starting switches 96 which as shown in FIG. 1, respectively are positioned adjacent opposite outer sides of the machine 14, wherein said hands of the operator are in a safe position and the closing of said starting switches initiates operation of the driving mechanism described hereinafter, which will advance the carcass, which has just been mounted by the operator, to first station in which the wing tips 16 are severed from the wing sections 18. Such movement of the carcass 10 extends from the position shown in FIGS. 9 and 10, to the position shown in FIG. 11, in which position, as can be visualized from FIGS. 4 and 9, the particular straight section 66 of the conveyor 48 which is shown in said figures at an angle to the ends 78 upon which the carcass has been mounted, will have moved clockwise, to the left, as viewed in FIG. 4 and 9 in order to dispose the section 66 in firm clamping relationship relative to the spear-like end 78 against which it is positioned and, because of the chain sections 64 being secured to the intermediate poriton 82 of the supporting member 74 and the legs 84 of said members also being very accurately guided by the guide channels 88, the straight section 66 will be firmly clamped against the spear-like end 78, the firmness of clamping is due to metal-to-bone engagement by the clamping members, and pins 68 will be impinged into the upper surface of the vertebra.

CONVEYOR DRIVE MECHANISM

Exemplary drive mechanism for the conveyor 48 is illustrated in FIG. 5. In this particular embodiment of drive mechanism, exemplary means are illustrated for purposes of effecting reciprocable, step-wise movement of the conveyor 48. To effect such movement, the shaft 56 is utilized as the driving shaft, particularly since it is near the discharge end of the machine where there is more space readily available to accommodate the drive mechanism. A spur gear 98 is rotatably mounted upon shaft 56 and the teeth thereof are engaged by an elongated rack 100 which is operated by a fluid-actuated cylinder 102, opposite ends of which are connected to a source of fluid under pressure and also a reservoir to which discharge fluid returns, all of which is of standard construction and therefor is not illustrated. The valves which control the flow of such fluid likewise are not shown but are actuated by the starting switches 96. Due to the fact that clockwise drive of the shaft 56 is desired, there is a ratchet gear 104 connected by a key to the shaft 56 and a plurality of pawls 106 which are carried by the spur gear 98, engage the teeth of the ratchet 104 in a manner to effect clockwise rotation of shaft 56 when the rack 100 moves toward the cylinder 102 after said rack has initially been projected to the phantom position shown at the left hand end of FIG. 5.

The rack 100 preferably is maintained in driving relationship with spur gear 98 by pressure means, one suitable form of which comprises a cylinder and piston unit 108 which is connected to the outer end of an arm 110 that is rigidly connected to the outer end of the cylinder unit 102 and a guide block thereon is slidably engaged by the rack 100. The unit 108 is of the safety type which is capable of being released in the event of a malfunction or an accident, the same being controlled by suitable safety switch, not shown, of conventional type. The driving stroke of the rack 100 is selected to be such as to move each carcass a pre-determined increment along the path defined by the lower span 76 of the conveyor and thereby position said carcasses respectively and accurately adjacent the dismembering stations which are spaced longitudinally along said lower span of the conveyor and details of which are described hereinafter.

It is also to be understood that although one preferred type of power to be utilized to drive the shaft 56 is the fluid actuated mechanism shown in FIG. 5 which preferably is operated by hydraulic pressure for smooth and even movement of the conveyor along its controlled path, other equivalent types of power means may be employed such as other mechanical mechanism, electrically actuated mechanism, or otherwise.

Figure 6:
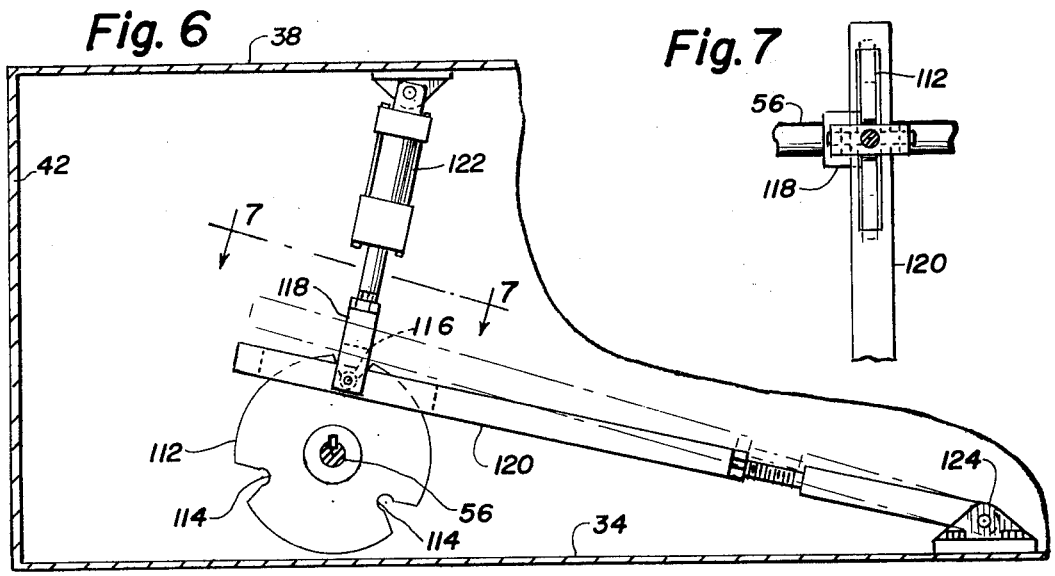
FIG. 6 is an enlarged fragmentary side elevation of locking mechanism for the conveyor as seen on the line 6—6 of FIG. 1.
Figure 7:
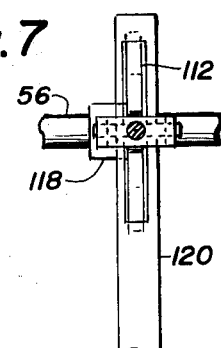
FIG. 7 is a fragmentary plan view of a detail of the locking mechanism for the conveyor as seen on the line 7—7 of FIG. 6.

Additional means are also provided to insure accurate positioning of the carcasses respectively on the supporting members 74 adjacent each of said dismembering mechanisms and stations. One suitable example of positioning means is shown in FIG. 6 and is located preferably within elongated housing 34, adjacent the left hand thereof, as viewed in FIG. 1, where there is ample room to accommodate the same. Said mechanism comprises a disc 112 which is keyed to shaft 56 and is provided with a series of locating notches 114 precisely positioned therein at even circumferential distances, said notches being engageable by a positioning roller 116 mounted upon a transverse pin extending between the lower ends of the legs of a yoke 118. The legs of said yoke also extend downwardly and receive therebetween the outer end of a guide member 120, the pin which supports the positioning roller 116 also extending through aligned transverse openings in the legs of the yoke 118 and the member 120.

The yoke 118 is actuated by the piston rod of a piston and cylinder unit 122 which moves the guide member 120 as well the positioning roller 116 accurately in arcuate manner toward and from one of the notches 114 in the disc 112. The opposite end of guide member 120 is pivotally connected to a clevis 124 which is fixedly connected to a panel of the housing 34. The piston and cylinder unit 122 is fluid operated, such as by compressed air and suitable conduits to opposite ends of the cylinder, not shown, are connected to control valves which function at the completion of an advancing stroke effected by the cylinder unit 102 and the rack 100 thereof shown in FIG. 5. The accurate distance traveled between successive notches 114 in the disc 112 accurately corresponds to the advancing movement of the carcass supporting member 74 as they are moved by the conveyor 48. Accordingly, at the end of each advancing movement of the supporting members and conveyor, the roller 116 will be moved into one of the notches 114 with which it is in close engagement to provide desired accuracy of the position for each of the supporting members 74 along said conveyor 48. Also, it is to be understood that other mechanical means or electrical apparatus may be used in lieu of the piston and cylinder unit 122 to effect the movement of the positioning roller 116 relative to one of the notches 114, if desired.

CONTROL FOR DISMEMBERING MECHANISMS

As will be seen hereinafter, substantially all of the movable dismembering members for separating the various components of a carcass are illustrated as being exemplary fluidoperated means, such as by the employment of compressed air with the exception of the fluid used in cylinder 102 of the conveyor drive mechanism. Further, while other mechanical means or electrical means may be employed to accomplish equivalent functions to operate said movable dismembering members, the illustrated fluid-actuated means have been selected for purposes of explaining the operation of the machine comprising the present invention, especially since said fluid-operated means performed to a high degree of satisfaction in tests.

Figure 8:
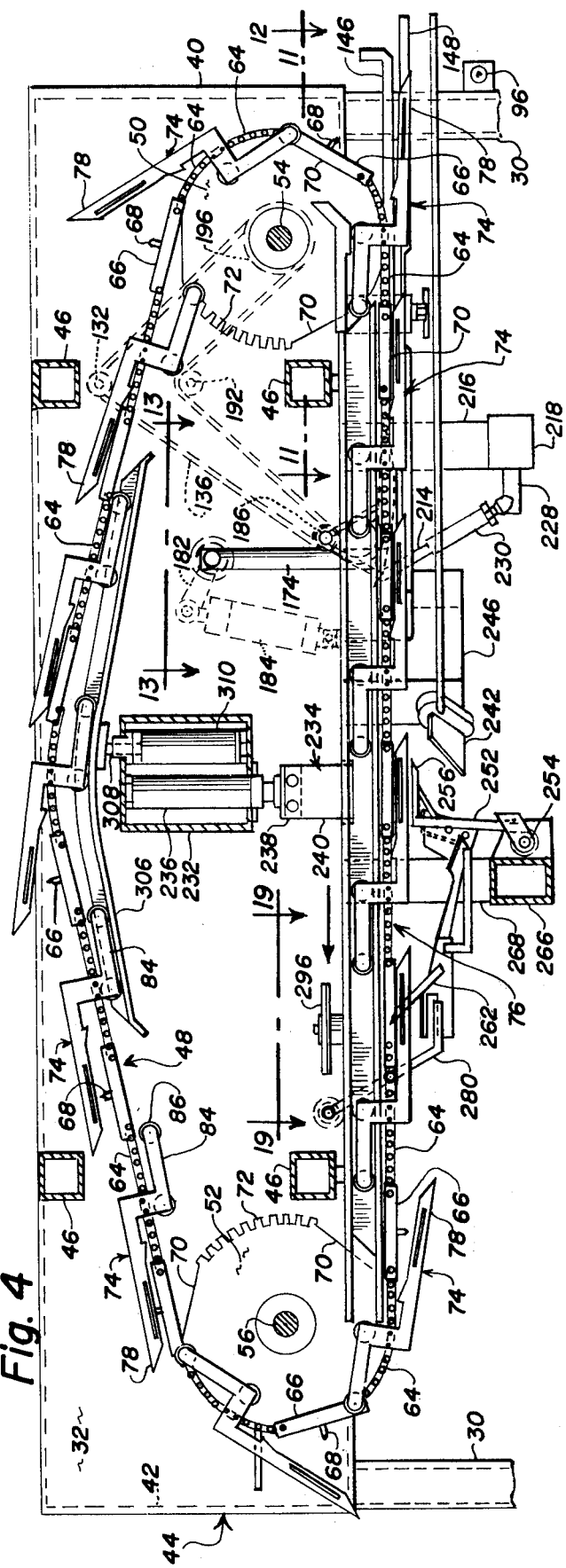
FIG. 8 is a fragmentary vertical elevation showing a cam shaft and cams mounted thereon in association with fluid control valves which effect operation of the various severing and separating components of the machine, as seen on the line 8—8 of FIG. 1.

The various cylinders of the fluid-operated mechanisms are controlled by a pair of valve-banks 124 and 126 which are best shown at opposite elongated sides of FIG. 1. These valves respectively are mounted upon transversely extending supporting members 128 and 130 which extend between the interior walls 36 and 38 of the housings 32 and 34 as well as the outer walls of said housing as clearly shown in FIG. 3. Rotatable shafts 132 also extend transversely respectively between said inner and outer walls of the housings 32 and 34 in parallel relationship to the supporting members 128 and 130 and closely adjacent the same, the outer ends of said shaft being rotatably supported within appropriate bearings 134 and said shafts are driven by sprocket gears respectively fixed thereto and around which sprocket chains 136 extend, said chains also extending around driving sprockets 138, best shown in FIG. 1, which are fixed to the opposite ends of shaft 54 upon which the forward sprocket disc 50 is fixed. Hence, it will be seen that the rotatble shafts 132, which actually are cam shafts, have a series of cams 140 connected thereto which respectively operate plunger members 142, for example, shown in FIG. 8, which actuate the valves of the banks 124 and 126 thereof which control the functioning of the various operating cylinders of said fluidoperated dismembering mechanisms. Hence, it will be seen that the drive for the control means is directly connected to the conveyor drive means which, in turn, is independently controlled by actuating the starting switches 96 and the operating means controlled thereby is of such nature that the conveyor will be moved one increment of distance each time it is actuated by switches 96, said distance being equal to the distance between the functionings of the successive dismembering mechanism. In views of the drawings, in substantially all of said mechanisms, there are similar units thereof respectively positioned adjacent opposite sides of the path of movement of the carcasses as they are conveyed by the lower span of the conveyor as controlled by the guide channels 88. Accordingly, there are two similar banks of valves 124 and 126 respectively disposed adjacent opposite sides of the machine, the same being controlled and actuated by similar sets of cams 140 which are mounted upon the individual rotatable shafts 132 respectively disposed for operation on opposite sides of said path of movement of the carcasses, as clearly shown in FIG. 1.

WING DISMEMBERING MECHANISMS

As has been indicated above, the wings on opposite sides of the carcasses 10 each comprise three individual portions which are to be severed to each other, namely, the tips 16 which are severed from the outer ends of the sections 18 by knife means which cut substantially through the joints, and the stubs 20 which are counted at the outer ends thereof to the inner ends of the sections 18 by joints that are quite small and may be separated by knife means that cut therethrough. However, the separation of the end of the stub 20 which is pivoted near the vertebra of each carcass is connected thereto by a ball and socket joint that is not severed but, rather, the ball of the stub is separated from its socket in the vertebra after severing the tendon therebetween.

At the time the carcasses are mounted upon the supporting member 74 at the loading end 12 of the machine, in addition to the operator extending the spearlike end 78 of the supporting members into the cavity of the carcass, the operator also laterally extends the wings respectively from opposite sides of the carcass to dispose the joints between the sections 18 and stubs 20 slidably and respectively within the elongated spaces 144 between the vertically spaced pairs of upper guide rails 146 and lower guide rails 148, the same being disposed adjacent opposite sides of the conveyor 48 as best shown in plan view in FIGS. 1 and 10. As seen from FIG. 9, the rails 146 are above the lower rails 148 a sufficient distance to provide the spaces 144 of such dimension that they tend to impose a drag upon the wings as they slide within the space 144 due to being propelled along the path of movement by the conveyor 48, for purposes to be described. Additional guide means comprise a further pair of guide rails 150 which are spaced transversely apart and receive therebetween the intermediate portions 82 of the supporting members 74, as clearly shown in FIGS. 9 and 10. Also as seen in FIG. 10, the forward ends of said guide rails 150 are connected to form a forward pointed end 152. The rails 150 are slidably engaged by the inner surfaces of the legs and thighs as the carcasses are moved along the path in the machine determined by conveyor 48.

For purposes of clarity as well as help in understanding the operation of the machine, it will be seen in the various figures that the joints between individual members or components of the carcasses are illustrated by small circles. Thus, in FIG. 9, while the joint between the section 18 and stub 20 slides along the space 144, the extremity of the tip 16 hangs downward below the guide rail 148 and as the carcass is moved along its path, tips 16 of the wing are engaged at the joint thereof with the sections 18 by pivoted plate-like arms 154, see FIG. 11, which move from the phantom position thereof in which they are parallel to the path of movement of the carcasses, to the transverse position shown in FIG. 11. In the latter position, the arms 154 are disposed within a space between upper and lower plates 156 and 158 of a U-shaped guard which is fixedly supported to posts 160, see FIG. 12, which extend downwardly from the lower surfaces of the housing 36 and 38. The trailing edges of the arms 154 also include a sharp blade 162. As the leading edge of the arms 154 move toward the transverse position thereof, they force the tip 16 of the wing within the space between the plates 156 and 158 and when the sharp blade 162, comprising first knife means, reaches said space, it shears the tip from the section 18 of the wing.

Figure 11:
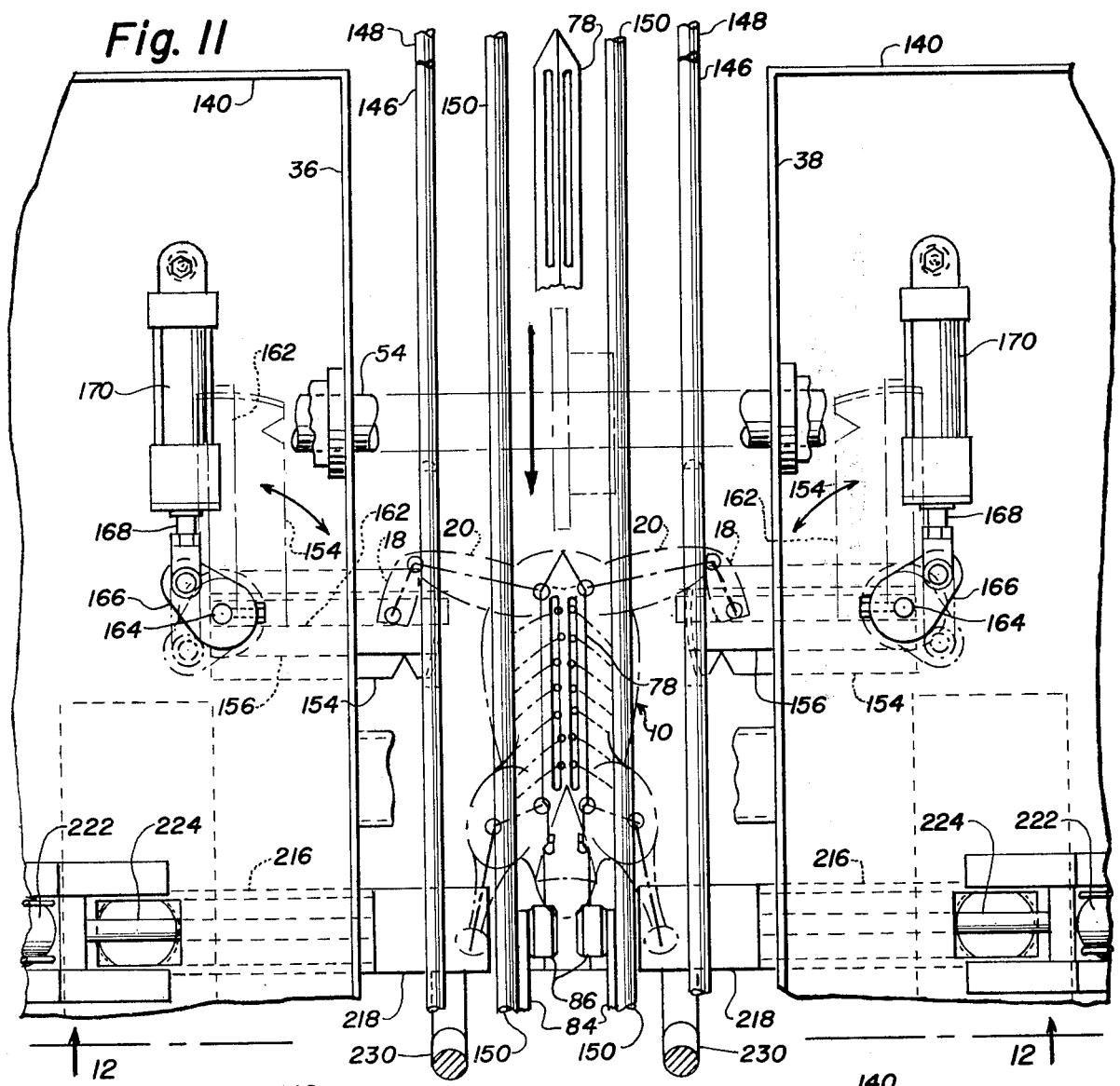
FIG. 11 is an enlarged fragmentary horizontal sectional view taken on the line 11—11 of FIG. 4 and showing details of the severing means by which the wing tips are separated from the adjacent wing sections of the carcasses.

As best shown in FIG. 11, the arms 154 and the sharp blades 162 attached thereto are connected at one end to a vertical shaft 164. A short crank arm 166 is fixed to the upper end of each of the shafts 164 and the outer ends of said crank arms are engaged by a clevis connected to the outer end of the piston rod 168 of a fluid-operated cylinder unit 170, the operation of which is controlled by certain of the valves 124 in the bank thereof shown in FIGS. 1 and 3.

The next operation in the wing severing action is illustrated in FIGS. 13 and 14. In this portion of the mechanism, the sections 18 of the wing are separated from the wing stubs 20. This is accomplished while the outer ends of the sections 18 are within the space 144 between guide rails 146 and 148 respectively adjacent opposite sides of the path of the carcasses. While the joint is held adjacent the vertically aligned guide rails 146 and 147 immediately adjacent the outer surfaces thereof, as shown in FIG. 13 in which the apparatus adjacent only one side of the path of the carcasses is illustrated for simplicity, there is a knife blade 172 which has a sharpened lower edge as viewed in FIG. 14. One end of said knife blade, comprising second knife means, is fixed to the lower end of a pivoted arm 174, the upper end of which is fixed to a transverse shaft 176 which is suitably supported within bearings 178 and 180 fixed to appropriate portions of the housing. Also connected to shaft 176 is a crank arm 182 which is operated by the piston rod of a fluid-operated cylinder unit 184 shown in FIG. 13. Said cylinder is controlled by certain of the valve means 124 of the bank thereof shown in FIGS. 1 and 3 for movement of the cutting edge of blade 172 arcuately, clockwise as viewed in FIG. 14, in order to produce a slicing cut through the joint between the wing sections 18 and the stubs 20. It will be understood that although only a single knife blade 172 is shown in FIG. 13, there is a corresponding blade as well as associated mechanism therefor mounted on the opposite side of conveyor 48 for severing the other wing section 18 from the stub 20, such severances occuring simultaneously on opposite sides of the conveyor 48.

Operable in association with the knife blades 172 respectively adjacent opposite sides of the conveyor 48 and the path of movement of the carcasses 10 thereby, are a pair of rotatable shafts 186, only one of which is shown in FIG. 13. Said shafts are supported within suitable bearings 188, 190 that respectively are fixed to certain panels of the housing 34. Said shafts are driven by sprocket chains 136 which, in turn, are driven by the shaft 54 which supports the forward sprocket disc 50 and, by means of the conveyor 48, is actually driven by the drive shaft 56 upon which rearward sprocket disc 52 is mounted as clearly shown in FIG. 4. In FIG. 4, it also will be seen that the sprocket chains 136 pass over an idler sprocket 192. Also, a relatively small diameter driven sprocket gear 194 is fixed to each of the shafts 186 and the chains 136 drive the same. Due to the chains 136 being driven by much larger diameter sprocket gears 196, as shown in FIG. 4, one increment of movement of the conveyor 48 will result in one complete revolution of the shafts 186, which is important for the following reason.

Each of the shafts 186 are rotatably driven simultaneously by the respective chains 136 which also are simultaneously driven by shaft 54. Each of the shafts 186 have similar sets of multiple arms or fingers projecting radially therefrom, details of which and the functions thereof are as follows.

Referring to FIGS. 13 and 14, it will be seen that each set of the multiple arms or fingers comprise a first arm 198, a second arm 200 and a third arm 202. The function of said first arms 198 is to respectively engage the wing sections 18 at opposite sides of the path of movement and bend the sections somewhat backward in order that said second knife means, comprising blade 172, may sever the joint between said sections and the outer ends of the stubs 20 of each wing. Accordingly, it will be seen that the knife blades 172 respectively at opposite sides of the path of movement of the carcasses are oscillated simultaneously with the movement of the arms 198 at each side of said path.

From FIG. 14, it will be seen that the second arms 200 are radial as they extend from the shafts 186 but the outer ends thereof are arcuate and somewhat transverse to the portions of the arms which are connected to the shafts 186. The arcuate portions of arms 200, as the shafts 186 are rotated, engage the skin of the wing stubs 20 and thus somewhat tension the skin in order that the same will be cut between the wing sections 18 and stubs 20 by the knife blades 172 during the oscillatory movement thereof.

Before describing the function of the third arms 202, the nature of the inner terminal ends of the guide rails 146 and 148 should be described. By referring to FIG. 14, it will be seen that upper guide rail 146 terminates with an upwardly extending end 204 and is secured by means of a bolt 206 which extends through a transverse support bar 208 which is suitably secured to the interior wall 38 of the housing 34. The inner terminal end of the lower guide rail 148 has a lateral extension 210 extending away from a short vertical portion 212 of rail 148, this somewhat irregular arrangement being for purposes of affording clearance for third knife means comprising sharpened blades 214.

The third knife means, comprising sharpened bladess 214, are for purposes of severing the main tendon between each of the inner ends of the wing stubs 20 and the back or vertebra of each of the carcasses 10, said tendon being the one that holds the ball on the inner end of the wing stub operable within the socket in the vertebra or back and comprises a ball and socket joint to connect the stub to the back of the carcass. The severance of said tendon by blade 214 at each side of the carcass comprises one of the very important features of the present invention since it eliminates the possibility of any objectionable bone chips or pieces being formed. In conventional poultry carcass dismembering mechanisms, it is common practice to sever certain appendages of the carcasses from other parts thereof by means of rotary knives, saws, reciprocating knives or otherwise which commonly and frequently severs parts of ball and socket joints, leaving pieces of bone and chips thereof in the severed or separated carcass members. This is objectionable and it is the purpose of the present invention to eliminate the formation of such bone chips and pieces as much as reasonably possible. Not withstanding the fact that the present invention contemplates the separation of the wing tips from the wing sections and the separation of the wing sections from the outer ends of the wing stubs by knife means which cut through the joints, said joints are relatively minor and small in nature and minimize the possibility of any seriously objectionable bone chips or pieces being formed. This is particularly a fact in regard to severing the wing tips from the wing sections since the joints between the same are largely cartilage. In view of the fact that the ball and socket joint by which the wing stubs are connected to the back or vertebra comprises a major ball and socket joint, the present invention provides means for separating the same without cutting any of the bone structure associated with said joint.

From the foregoing description, it will be seen that the inner ends of the guide rails 146 and 148 terminate a very short distance beyond the operative positions of the knives 172 and 214. In view of this, and particularly since the guiding function of the rails 146 and 148 is utilized in holding the wing stubs 20 while the tendons of the ball and socket joints for said stubs are severed by the knives 214 at adjacent sides of the carcasses 10, it is necessary to terminate the guide rails 146 and 148 immediately past such tendon-severing operations in order that the separated wing stubs 20 may be ejected from the machine. Such ejection is accomplished by the third arms 202 which are carried by the rotatable shafts 186.

To facilitate ready understanding of the function of the various arms connected to the rotatable shafts 186, attention is directed to the four diagrammatic views 15a-15b.

Referring to FIG. 15a, the wing section 18 is in position to be severed by the second knife means comprisng blade 172. Arm 198 is engaging section 18 to stretch the jont so that the knife 172 readily may cut the same.

In FIG. 15b, knife 172 has been oscillated in cutting direction to sever the joint between the wing section 18 and stub 20 while arm 200 has engaged the skin between said wing section and stub to hold it so that it won't slide away from knife 172. It will be understood that during the functions performed by the illustrations in FIGS. 15a—15d, the carcass is moving, particularly in view of the fact that it is necessary to drive the shafts 186 by the sprocket disc 50 as the same is moved by the advancement of the conveyor 48 by the drive sprocket 52 adjacent the discharge end of the machine.

In FIG. 15c, knife 172 has accomplished its function and has returned to starting position. Wing section 18 which has been severed is in process of falling away from the machine into a suitable receptacle which, it will be understood, is provided along the lower portion of the machine and various receptacles are provided respectively to receive the different separated or severed commercial components of the carcasses but for purposes of simplicity, such receptacles have not been illustrated. Also in FIG. 15c, the arm 200 is pushing downward upon the stub 20 so as accurately to position the tendon to be severed by the blade 214.

Lastly in FIG. 15d, arm 202 engages the wing stub 20 to elevate it in order to separate the ball and socket joint of which the tendon has been severed by knife 214, said knife also severing any intervening skin or flesh between said wing stub and the back of the carcass. Also, continued movement of arm 202 in rotary clockwise direction ejects the separated wing stubs 20 from the terminal ends of the guide rails 146 and 148, said stubs falling by gravity into additional receptacles in the lower part of the machine, not shown.

While the function of the blades 214 has been set forth above, actuation and support thereof will now be described because, inter alia, the knives 214 have to be movably supported for the following reasons. As can be visualized from FIG. 13, wherein the vertebra 24 is illustrated somewhat diagrammatically and in phantom, the ball and socket joints by which the wing stubs are connected to the vertebra are close to each other, whereby the operative position of the THIRD knife means, comprising blades 214 respectively at opposite sides of the conveyor 48, as is shown in full lines in FIG. 13, quite close to the vertebra 24. It will be understood that in FIG. 13, only one half of the mechanism is shown, there being a similar arrangement of mechanism on the opposite side of the conveyor 48. Accordingly, as the carcasses move along the path therefor in the machine, tail-foremost, it is necessary to move the blades 214 laterally aside to the inoperative, phantom position shown fragmentarily in FIG. 13 in order that the saddle of the carcasses comprising the rear portion of the back thereof and the appended thighs and legs may move along without being engaged by the blades 214. Such movement of said blades to the inoperative position, as well as the supporting means for said blades, is as follows.

Figure 3:
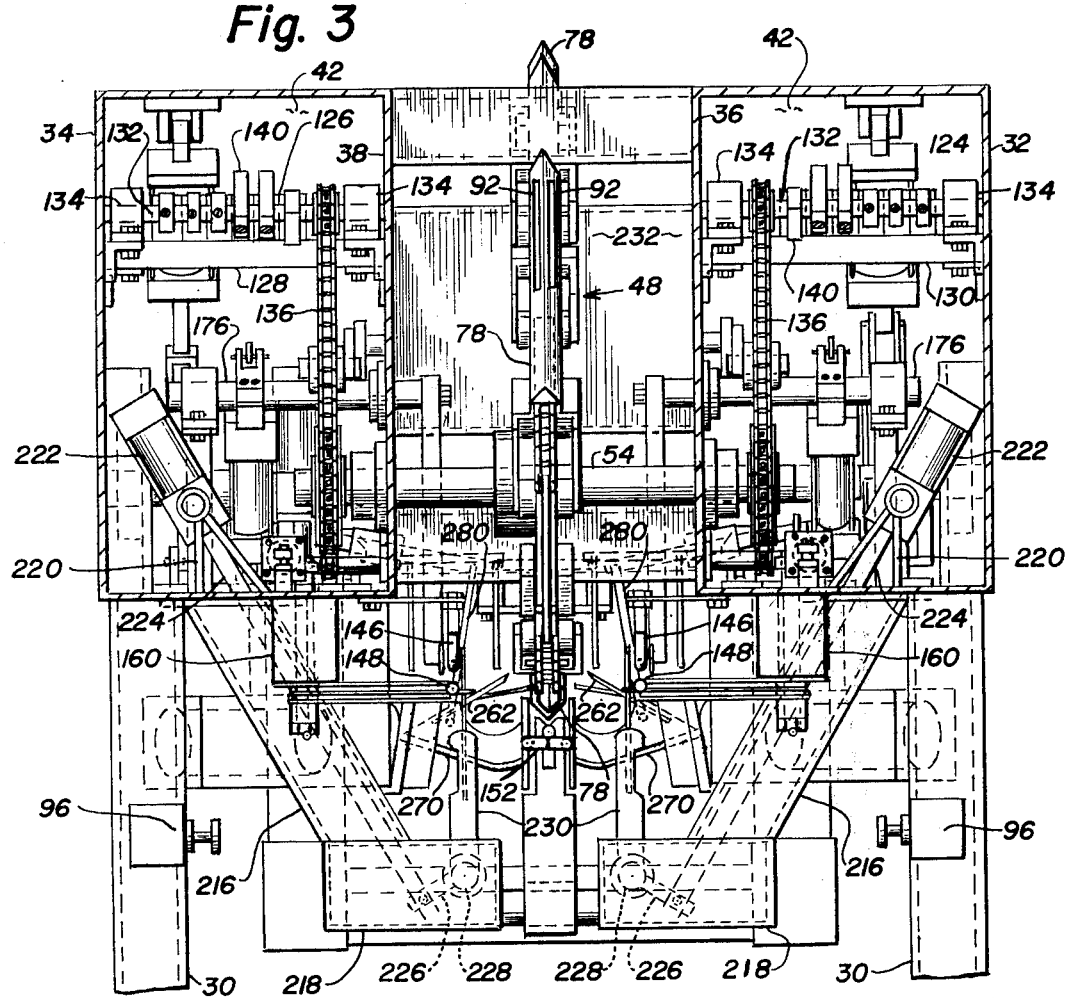
FIG. 3 is an end elevation of the entrance or loading end of the machine from which the front cabinet panel has been removed to disclose the interior elements.

Extending downward from the lower horizontal walls of the elongated housings 32 and 34 are a pair of diagonally extending tubular members 216 which are best shown in FIG. 3 but also appear in FIG. 4, the same terminating in horizontal enclosures 218 also shown in FIGS. 3 and 4. Supporting brackets 220, shown in FIG. 3, also extend upward from the lower panels of the housings 32 and 34 for purposes of supporting piston and cylinder units 222 which are mounted for limited oscillation relative to the upper ends of brackets 220. Piston rods 224 extend downward from the pistons in the units 222, through the diagonal tubular members 216, for pivotal attachment to the outer ends of crank arms 226 which are shown in FIG. 3, said crank arms being connected to the inner ends of short rotatable shafts 228 which project horizontally rearward from the horizontal enclosures 218, as is illustrated in FIG. 4. The outer ends of shafts 228 are adjustably connected to the lower ends of knife-supporting arms 230 to which at the upper ends thereof the third knife means comprising blades 214 respectively are connected adjacent opposite sides of the path of movement of carcasses within the machine.

From the foregoing, it will be seen that while some of the severing operations occur while the conveyor 48 is stationary between intermittent movements thereof in feeding direction, other severing operations, such as those described immediately above with respect to severing the wing sections from the stubs and separating the ball and socket joints which connect the wing stubs to the vertebra occur while the conveyor is moving. Such movement, incidentally, also is necessary to facilitate the separation of the wing stubs from the vertebrae due to the drag imposed upon the wing stubs as they are removed along the space 144 between guide rails 146 and 148 immediately prior to being discharged from the inner terminal ends thereof. Accordingly, such drag as is imposed upon said wing stubs cooperates with the limited lifting function performed by the arms 202 immediately prior to the discharging function performed by said arm in kicking the separated wing stubs from the terminal ends of the guide rails 146 and 148.

BREAST REMOVAL OPERATION

The entire breast 22 is connected to the carcass in two principal locations, one of these is where the ribs which support the breast are connected to the vertebra 24 and the other is where the soft, so called "belly" skin extends between the breast and thigh at opposite sides of the carcass. Therefore, it is necessary to sever these two connecting areas in order to separate the entire breast from the remaining portion of the carcasses at this stage of the operation, said remaining portion primarily comprising the saddle which is composed of the vertebra 24 and the tail bone in the rearward end thereof, as well as the depending connected legs and thighs 26.

Referring to FIGS. 3, 16 and 17, it will be seen from FIG. 3 that extending transversely between the interior walls 36 and 38 of housing 32 and 34 is a supplemental transverse housing 232 which, as shown in FIG. 16, encloses an actuating means for a fourth knife means 234. The actuating means 236 is specifically illustrated as a fluid-operated piston and cylinder unit which is supported within the transverse housing 232, the lower end of the piston being connected to a head 238 which supports a pair of vertically depending knives 240, the lower ends of which are sharpened. The space between the knives 240 is very small and substantially of the order of about one half inch, said space being only required to accommodate the vertebra of each carcass. At this point, it also should be mentioned that in accordance with government regulations, before each carcass is mounted upon the supporting member 74, it is necessary to incise two longitudinal slits in the skin along the back of each carcass adjacent the vertebra. This is for the purpose of insuring that when the thighs are separated from the vertebra of each carcass, the skin along the back or vertebra will remain thereon after such separation of the thighs.

It will be understood tht other means may be employed to vertically reciprocate the fourth knive means 234 rather than employ the piston and cylinder unit 236, if desired. The knives 240 of said fourth knive means respectively project through slots formed in the upper flange of the I-beam 90 which provide the guide channels 88 on opposite sides thereof, said knives extending downward on opposite sides of the connecting web of the I-beam, the sharpened lower ends of said knives respectively extending through the slots 92 in the spear-like end 78 of each of the carcass supporting members 74. Such actuation of the knives 240 occurs while the conveyor is stationary. It also can be appreciated that since the back of each carcass is very firmly clamped between the rigid section 66 of the conveyor and the spear-like end 78 of the supporting member 74 in bone-to-metal relationship, such downward projection of the knives 240 through the slots 92 will effectively and simultaneously separate both sides of the rib cage upon which the breast 22 is formed, immediately adjacent the opposite sides of the vertebra 24. Actuation of the unit 236 is initiated and controlled by certain valves in one of the banks 124 or 126 thereof.

Simultaneously with the reciprocation of the fourth knive means 234 to sever the ribs at the upper portion of the breast 22, the "belly" skin by which the rear portion of the lower part of the breast at opposite sides thereof are connected respectively to the thighs likewise is severed by additional knive means 242 and 244. The knife means 242 comprise movable blades and knife means 244 comprise stationary blades. These are best shown in FIGS. 16 and 17.

Referring to FIGS. 16 and 17, and also to FIG. 1, it will be seen that the movable knives 242 are supported on the outer ends of plungers operated by fluid-actuated cylinder unit 246, the blades being supported upon head 248 which have bearing openings slidable upon stationary guide rods 250. From FIG. 1 in particular, it will be seen that the path of movement of the blades 242 is along an axis extending substantially at an angle of about four or five degrees to the longitudinal axis of the conveyor 48. The cutting edges of the knives 242 also is at an angle so that when the movable blades 242 are projected inwardly for co-action with the stationary blades 244, positive shearing action will occur to sever said "belly" skin and thereby, in conjunction with the operation of the vertically movable knives 240 of the fourth knife means, the breast will be severed from the remaining portion of each carcass which is still clamped securely to the conveyor 48.

For purposes of insuring the separation of the severed breast 22 from the machine, referring to FIG. 16, it will be seen that a kicker member 252 is fixedly connected at one end to a transverse shaft 254. The opposite end of kicker member 252 has a projection 256 which, in the full line position thereof shown in FIG. 16, extends horizontally and toward the loading end of the machine. As the carcasses are advanced toward the left, as viewed in FIG. 16, by the conveyor 48, the projection 256 at the upper end of the kicker member 252 will be extended into the interior of the breast 22 so that at the completion of the severing operation for the breast, the kicker member 252 and the projection 256 thereof will be moved sharply in clockwise direction as viewed in FIG. 16 by a power means to kick the severed breast from the carcass and the machine for reception within additional receptacle means provided in the lower part of the machine but not shown in the drawings.

Kicker member 252 is operated by a fluid-actuated piston and cylinder unit 258, operation of which is controlled by certain of the valve units of banks 124 and 126 to operate crank 259 on shaft 254. Also, when the kicker member 252 is restored to its inoperative position shown in full lines in FIG. 16, the returned position thereof is controlled by an adjustable stop 260.

LEG AND THIGH REMOVING MEANS

The mechanism for separating or removing the connected legs and thighs from the back or vertebra of each of the carcasses in the machine comprising the present invention are best illustrated in FIGS. 17–20. Following the severance of the breast and removal thereof from the back or vertebra of each carcass, the saddle, comprising the back and depending legs and thighs is sequentially moved by the conveyor to a FIFTH knive means comprising a pair of inwardly and upwardly extending blades 262, the function of which is to sever the principel tendons which hold the balls of the thighs which engage sockets in the vertebra to comprise the ball and socket joint by which the thighs are connected to the carcass. One end of each of the blades 262 is fixedly connected to a transverse supporting member 264 which, in turn, is fixed to a cross member 266 also shown in FIG. 4, wherein it will be seen that depending frame members 268 are connected to the lower panels of the elongated housings 32 and 34 respectively. Said cross member 266 also supports transversely spaced bearings for shaft 254, described above in conjunction with kicker member 252.

At this stage of the operation, the connected legs and thighs 26 are all that remain connected to the vertebra 24 of each of the carcasses and said legs and thighs depend downwardly from opposite sides thereof. For purposes of positioning the thighs for severance of said aforementioned tendons by the fifth knive means 262, said tendons are placed under tension by spreading the legs and thighs away from each other with respect to the vertebra 24 and this is accomplished by means of a camming plate 270 which has a tapered forward end 272 and from said forward end, the opposite sides of the plate 270 extend outward and downward as can best be visualized from FIG. 17 which is a front end view thereof looking toward the discharge end of said machine. There is a central opening 274 in the cam plate 270 through which the conveyor passes. Also, as best shown in FIG. 20, the effective ends of the stationary blades 262 comprising the fifth knive means also project through the cam plates 270 in order to be positioned to sever said aforementioned tendons. Such severance has just occurred immediately prior to the legs and thighs 26 reaching the position shown in FIG. 20.

The structural means for supporting the cam plate 270 also are best shown in FIGS. 19 and 20 in which the transverse supporting member 264 is shown and extending therefrom toward the loading end of the machine is a plate 276 which is integral with the supporting member 264 and, as shown in FIG. 19, comprises a T-shaped arrangement therewith. The plate 276 is secured by bolts 278 to the cross member 266 of the frame means. Posts 278, such as metal rods, extend upwardly from opposite ends of the supporting member 264 and the upper ends thereof are connected to the inner surfaces of opposite side portions of the camming plate 270.

As has been stated above, the slidable movement of the legs and thighs 26 over the upper surfaces of the camming plate 270 tensions the tendons of the ball and socket joints which connect the thighs to the vertebra 24 and position the same for severance of said tendons by the stationary fifth knife means which comprise blades 262. At this stage of the operation, it is therefor necessary to effectively separate the ball of said joint from the socket thereof in the vertebra 24 and this has to be done very carefully so as not to break any of the bone of the vertebra and especially the tail bone adjacent which the socket is located. Were said bone to be broken, part of the bone would be carried with the thigh when it is separated from the back or vertebra of the carcass.

In order to separate the ball and socket joints referred to above and particularly to do the same carefully, the machine of the present invention includes a pair of lifting arms 280 which respectively are disposed on opposite sides of the path of movement of the carcass through the machine by conveyor 48. The camming plate 270 and lifting arms 280 comprise appendage manipulating means. Said arms are connected at one end to the inner ends of a pair of rotatable shafts 282 which are mounted in suitable bearings provided in vertical support members 284 at opposite sides of the machine. From FIG. 17, it is to be noted that the shafts 282 are disposed at an acute angle to the horizontal, approximately 5°. This is for purposes of controlling the movement of the arms 280 in such a manner that as the legs and thighs are being elevated by the arms 280, at least the critical portion of the lifting thereof occurs carefully and somewhat slowly so as not to break the bone of the back or vertebra as mentioned hereinabove.

The shafts 282 respectively are oscillated through a limited arc subtending an angle between the full line and phantom line illustrations of said arms 280 in FIG. 20. Initially, the outer ends 284 of said arms, which are bent at an angle to the main portions thereof, are disposed below the camming plate 270 and the ends 284 are movable through slots 286 formed in opposite sides of the camming plate 270 as also shown in FIG. 20. A fluid-operated piston and cylinder unit 288, see FIGS. 17 and 22, is provided respectively at opposite sides of the machine, the pistons thereof operating a crank arm 290 for purposes of oscillating the arms 280 through the arc of movement referred to above, as illustrated in FIG. 20.

In addition to separating the ball and socket joint by which the thighs of the leg and thigh members 26 are connected to the vertebra 24 and tail bone 28, in a manner which results in no bone fragments or chips occuring, due particularly to severing the tendons of said joint and then raising the legs and thighs carefully to effect such disconnection of the ball and socket joint, another very important feature of the present invention occurs incident to such separation, as follows. During the elevation of said leg and thigh members 26, the arms 280 gradually approach the hock end 292 of the legs of said members 26, as illustrated in FIGS. 20 and 22. In FIGS. 17 and 20, it will be seen that immediately above the I-beam 90 adjacent the rearward end thereof in the machine, a guide member 294 is mounted stationarily and preferably comprises a pair of parallel bars 296 of limited length. It will be noted from FIGS. 17, 19 and 20, that the arms 280 also have small stop members 298 adjustably mounted thereon. As best seen in FIG. 19, it can be visualized that as the arms 280 are elevated, they will gradually respectively approach the parallel bars 296 and trap the outer end of the legs therebetween.

As the vertebra 24 and tail bone 28 are moved during the next increment of movement toward the discharge end of the machine, the ball and socket joint between the thigh and vertebra or tail bone will be carried along therewith while movement of the hock end of the leg will be halted due to engagement of the hock end 292 with the stop member 298 on the arm 280 which extends across the slot between the parallel bars 296 and the arms 280 when in the elevated position shown in phantom in FIG. 20. Continued movement of the vertebra and tail bone by the conveyor however actually tears the thigh from the vertebra and tail bone and thereby separates the ball and socket joint without producing any bone chips or fragments.

Of equal importance to the type of separation of the legs and thighs from the vertebra and tail bone as described immediately above is the fact that appended to the outer end of each thigh and disposed within a small cavity in the back of fowl at either side of the vertebra are two small, very choice pieces of flesh which are highly regarded by epicureans. These morsels of choice flesh are referred to as "oyster". Incident to the tearing of the thighs from the vertebra and tail bone as described above, said "oysters" are shown in somewhat diagrammatic manner in FIG. 21 and designated by the numeral 300. Accordingly, it will be seen that the removal of the "oysters" from the backs or vertebra 24 of each of the carcasses results in the same being salvaged with the thigh and thereby enchances the food value of the same as well as preventing said "oysters" from being discharged with the backs from which all other elements of the carcass now have been removed at this stage of the process. Normally, the backs in such condition are considered as being of little value in the poultry handling industry but certain procedures are undertaken to salvage as much food value as possible from said backs which very largely are composed of bone but nevertheless have a limited amount of flesh and skin thereon, the latter primarily being salvaged for food purposes but such operation comprises no part of the present invention.

Referring now to FIGS. 21 and 22, the only remaining step to be performed by the machine is to insure the discharge of the vertebrae 24 and the tail bones 28 connected thereto. From FIG. 21 in particular, it will be seen that as the conveyor 48 moves around the driving sprocket disc 52, the spear-like trailing end 78 of the supporting member 74 progressively separate from the straight section 66 of the conveyor relative to which they have been in clamping engagement for the backs of the carcasses. When said supporting members are disposed in the rearmost position thereof in the machine as shown at the left hand side of FIG. 21, it will be seen that the clamping members 66 and 78 have been fully disengaged from each other, whereby the vertebra 24 and tail bone 28 thereon are unclamped, and to insure discharge of the same from the conveyor, a pair of stop blades 302 are disposed respectively adjacent opposite sides of the path of movement of the supporting members 74 and are positioned to engage particularly the tail bone 28 as can be appreciated from FIG. 22. The stop blades 302 are supported by appropriate brackets 304 that are respectively fixedly connected to interior walls 36 and 38 of the housings 32 and 34.

Following the discharge of the vertebra and tail bone units from the conveyor 48, the upper span of the conveyor moves into the upper portion of the machine, as best shown in FIG. 4. An upper guide 306 is movably supported in the upper portion of the machine in the space between the opposite housings 32 and 34. Opposite end portions of the guide 306 extend downward in opposite directions and said guide is engaged by the rollers 86 which are rotatably mounted upon the forward legs 84 of the supporting members 74. The guide 36 also is connected to the upper end of a piston rod 308 which is operable by a fluid-operated cylinder unit 310 which, for sanitary purposes, is also mounted within the transverse housing 232 shown in FIGS. 3 and 4. The cylinder unit 310 is constantly maintained under limited pressure for purposes of providing desired tensioning of the conveyor 48, whereby especially the lower span thereof will be maintained accurately in longitudinal direction, especially to dispose the respective carcass supporting member 74 in evenly spaced position and thereby insure positioning of the carcasses thereon accurately with respect to the various dismembering mechanisms disposed in longitudinally spaced relationship adjacent the lower span of conveyor 48.

From the foregoing, it will be seen that the present invention provides a machine for automatically dismembering the major commercial members or components of poultry carcasses under sanitary as well as safe conditions from the standpoint of human operators of the machine. Actually, only a single operator is required to mount the carcasses respectively on the supporting means of the conveyor and then effect advancement of the conveyor and carcasses stepwise by manipulating the safety located starting switches 96. As each carcass is mounted on the next successive supporting member at the loading end of the machine, the switches 96 are operated and thereby sequentially advance the carcasses and loading members for even increments of movement, respectively to dispose the carcasses adjacent the successive dismembering mechanisms. As described, and especially as illustrated diagrammatically in FIG. 2, the wing tips are automatically separated from the wing sections, said wing sections are separated from the wing stubs and the two major ball and socket joints at each side of a carcass, comprising those which connect the wing stubs to the vertebra and those which connect the thighs to the vertebra or tail bone, are separated by first severing the tendons which hold the balls within the sockets and then by suitable means, especially by imposing drags upon the appendages for the wing stubs and legs, separation of all of said ball and socket joints is accomplished without producing any bone fragments or chips. In addition, the choice "oyster" morsels likewise are separated from the backs of the carcasses incident to the separation of the thighs from the backs by a tearing operation. Such dismemberment of the carcasses can be accomplished by the machine on cooked carcasses as well as uncooked.

While the invention has been described and illustrated in its several preferred embodiments, it should be understood that the invention is not to be limited to the precise details herein illustrated and described since the same may be carried out in other ways falling within the scope of the invention as illustrated and described.

We claim:
1. A machine operable automatically to dismember dressed poultry carcasses into individual normal commercial components thereof comprising in combination:
 a. a longitudinal frame having inlet and exit ends,
 b. sprocket members mounted upon transverse shafts supported in said frame in longitudinally spaced relationship therein,
 c. an endless flexible conveyor extending around said sprocket members for support to provide upper and lower spans of said conveyor,
 d. drive means on said frame connected to one of said sprocket members and operable to drive the same to move said lower span of said conveyor from said inlet end toward said exit end of said frame,
 e. a series of elongated support members connected to said conveyor at longitudinally spaced locations and disposed outwardly from the periphery of said conveyor, whereby said support members are below the lower span of said conveyor in operation thereof and said support members when moving along said lower span having one end extending toward said inlet end of said frame and said one ends being adapted to be extended into successive poultry carcasses tail foremost with the back uppermost and the breast and legs depending from said support members,
 f. clamping means on said conveyor movably operable automatically relative to each support member as the conveyor moves from said inlet end of said frame to firmly engage the upper surfaces of the backs of said carcasses as said conveyor moves from said inlet end of said frame and thereby clamp said backs of said carcasses firmly and immovably upon said support members,
 g. dismembering means supported by said frame for operation adjacent said lower span of said conveyor, and
 h. means to operate said dismembering means to separate successively said commercial components of said carcasses from each other as said carcasses are moved by said conveyor toward the exit end of said machine.

2. The machine according to claim 1 in which said support members are spear-like and are connected adjacent one end of each member to said conveyor for support in cantilever manner.

3. The machine according to claim 1 further including elongated guide means parallel to said lower span of said conveyor, means on said support members engagable with said guide means to accurately position said support members for movement along a predetermined path relative to said dismembering means.

4. The machine according to claim 3 in which said support members further include means adjacent one end thereof engageable with said guide means to maintain said support members substantially parallel to the lower span of said conveyor as said support members move along said lower span thereof.

5. The machine according to claim 3 in which said conveyor comprises an interconnected series of chain sections interspersed between rigid link members, said support members each having a cantilever spear-like end which is projected into the carcasses of said poultry and each said end is opposite one of said rigid link members and parallel thereto when moving along said lower span of said conveyor, thereby to serve as clamping members which firmly clamp the backs of carcasses therebetween.

6. The machine according to claim 5 further including projections on one of said clamping members extending into the vertebra of each carcass and thereby further facilitate the clamping function of said members.

7. The machine according to claim 1 in which said drive means for said conveyor operates stepwise successively to dispose poultry carcasses on said conveyor adjacent the location of each of said dismembering means for operation thereof upon said carcasses while the same are intermittedly stopped.

8. The machine according to claim 7 further including means engagable with said conveyor and operable to lock the same when stopped relative to each of said dismembering means to insure accurate positions of the carcasses on said supporting members of said conveyor relative to said successive dismembering means along the path of said lower span of said conveyor.

9. The machine according to claim 8 in which said drive means for said conveyor are connected to one of said transverse shafts of said sprocket member and said lock means comprising a notched disc fastened to said one of said shafts, and a plunger locking member movable radially relative to one of said notches in said disc to effect said accurate positioning of said clamped carcasses on said conveyor relative to said dismembering means.

10. The machine according to claim 7 further including means operable to initiate driving movement of said conveyor, said means being a manually operable member located in a safe position with respect to the hands of an operator, said initiation of movement of said conveyor occurring following the mounting of each carcass upon one of said supporting members of said conveyor, thereby insuring removal of the hands of an operator from said conveyor and dismembering means incident to initiating movement of said conveyor and operation of said dismembering means.

11. The machine according to claim 7 in which control means for the drive means for said conveyor and operating means for said dismembering means are cam-operated and comprise in combination, a rotatable cam shaft supported by said frame, valve-operating cams on said shaft, means interconnecting said cam shaft to one of said transverse shafts for said sprockets, said drive means for said conveyor being power-operated and connected to said one of said transverse shafts for a sprocket member, and manually operable control means interconnected to said power means located in a safe position upon said machine to insure a safe position for the hands of an operator when movement of said machine is initiated.

12. The machine according to claim 1 in which said conveyor comprises a series of rigid links, similar short chain sections interconnecting said links, said support members being connected respectively to said chain sections and each of said support members including a trailing cantilever end which is extended into each carcass, means connecting an intermediate portion of each of said support members to said chain, elongated guide means adjacent the lower span of said conveyor, said support members having leading ends thereon, and means said leading ends of said support members engaging said guide means to maintain said trailing cantilever ends of said guide members substantially parallel to said lower span of said conveyor.

13. The machine according to claim 12 in which said guide means comprise channels and said means on the leading ends of said support members comprising anti-friction rollers movable within said channel.

14. The machine according to claim 13 in which the leading ends of said support members are U-shaped in cross section to provide a pair of forwardly extending legs, said chain sections being received between and connected to said legs, said guide means also comprising a pair of oppositely facing channels, and each leg of said leading ends of said support members extending parallel to the trailing ends thereof and each of said legs having a pair of longitudinally spaced guide rollers supported thereon and respectively engaging and moving longitudinally along said opposing guide channels to insure said trailing cantilever ends of said support members moving accurately within a path along said lower span of said conveyor.

15. The machine according to claim 12 in which one end of said guide means is adjacent the sprocket nearest the inlet end of said frame and said guide means terminating adjacent said other sprocket, said machine including additional guide means mounted within the upper portion of said longitudinal frame and engagable by at least the intermediate portion of the upper span of said conveyor, and means also carried by said frame and operable to place said additional guide means under tension in a direction to maintain said conveyor taut.

16. The machine according to claim 15 in which said tensioning means for said additional guide means comprises a pneumatically operated cylinder and piston unit.

17. A machine for dismembering dressed poultry carcasses comprising in combination:
a. a conveyor,
b. means on said conveyor to firmly clamp the backs of and support dressed poultry carcasses thereon for movement along a predetermined path,
c. means mounted adjacent said path and operable to extend appendages of said carcasses which are connected thereto by ball and socket joints to tension the tendons of said appendages,
d. tendon-severing means supported adjacent said path and positioned to sever said tendons without cutting the bone of said joints, and
e. appendage-manipulating means operable to engage said appendages after the severing of the tendons thereof and restrain movement of said appendages while said backs of said carcass are moved by said conveyor in a direction to effect separation of the balls of said joints of said appendages from the sockets thereof without shattering the bone of said joints.

18. The machine according to claim 17 in which said appendage-manipulating means comprise guide means positioned to be engaged by the outer ends of said appendages of said carcasses as the same are moved by said conveyor along said predetermined path, thereby to place tension upon said appendages to effect said separation of the balls of said members from said sockets therefor.

19. The machine according to claim 18 in which said tendon-severing means are knife means having at least one sharp cutting edge.

20. The machine according to claim 18 further including guide means for said appendage-manipulating means comprising pairs of substantially parallel elongated rail members spaced apart a limited distance for reception of the terminal ends of said appendages for sliding movement along said rail members.

21. The machine according to claim 20 further including means operable to eject separated appendages of said carcasses from said elongated guide members.

22. The machine according to claim 17 in which said carcasses are supported upon said conveyor in back-uppermost position with the tails of said carcasses foremost and the legs and breasts depending downward from opposite sides of said conveyor and in which said appendages of said carcasses comprise wing stubs connected to the saddles of said carcasses and having an enlargement on the outer ends thereof, and in which machine said tendon-severing means comprise a pair of knife blades extending upward and inwardly toward the path of movement of said carcasses respectively adjacent opposite sides of said carcasses as advanced by said conveyor, said machine further including means operable to move said knives outwardly away from the sides of said carcasses as said legs pass between said knives and said means then being operable to move said knives inwardly toward said carcasses to position said knives accurately to sever the tendons between said wing stubs and vertebrae of said carcasses, and arm means movable to engage said wing stubs for said severing.

23. The machine according to claim 17 in which said carcasses are supported back-uppermost and tail foremost upon said conveyor with the legs and thighs depending downwardly and in which machine said means for severing the tendons between said thighs and vertebrae comprise cam means respectively on opposite sides of said path of movement of said carcasses and operable to be slidably engaged by said legs and thighs to extend the same outwardly and stretch said tendons, said machine also including knife blades having cutting edges extending upwardly and forwardly adjacent opposite sides of said carcasses as moved over said cam means and operable to sever said tendons which connect the ball and socket joints of said thighs to said vertebrae, arm means movable to engage the hock ends of said legs and elevate the same for slidable guiding movement, and means to stop movement of said hock ends while said conveyor pulls said vertebrae along said path and thereby separate the ball of the joint of said thighs from the socket therefor and tear the thigh and the oyster appended thereto from said vertebrae.

24. A machine operable automatically to dismember dressed poultry carcasses into individual components thereof comprising in combination:
  a. a conveyor movable between loading and discharge ends of said machine,
  b. supporting means on said conveyor in longitudinally spaced relation operable to clamp the backs of poultry carcasses to said conveyor for movement by one span thereof along a path with the legs and breasts depending downwardly,
  c. means to move said span of said conveyor along said path,
  d. guide rods adjacent opposite sides of said path operable to slidably suypport the wing tips and sections of said carcasses extended outward therefrom,
  e. first knife means movably operable to sever said tips from the sections of said wings,
  f. second knife means movable transversely to the joints between said wing sections and stubs and operable to sever said joints therebetween,
  g. third knife means positioned adjacent opposite sides of said path close to the opposite sides of said carcasses as moved along said path and operable to sever the tendons of the ball and socket joints connecting the wing stubs to the vertebra of each carcass while said stubs are extended outward,
  h. means positioned to engage each stub and effect pulling between said stub and vertebra to separate the ball of said stubs from their sockets in said vertebrae,
  i. fourth knife means operable to sever the ribs of said carcasses closely adjacent opposite sides of the vertebrae thereof along the breasts and also sever the rear portions of said breasts from the thighs,
  j. means operable to extend the connected legs and thighs outward from opposite sides of the vertebrae to extend the tendons of the ball and socket joints between the thighs and vertebrae,
  k. fifth knife means positioned adjacent said path and operable to sever said thigh tendons, and
  l. means operable to engage outer ends of the connected legs and thighs and stop movement thereof while said conveyor continues to move the vertebrae toward said discharge end of the machine and thereby separate the ball and socket joints which connect said thighs to said vertebrae by pulling the same apart and thereby tear said connected legs and thighs with the oyster appended thereto from said vertebrae.

25. The machine according to claim 24 further including power means to operate the drive means for said conveyor stepwise to feed said carcasses successively to said dismembering knives, and control means adjacent the loading end of said machine for said power means to actuate said drive means.

26. The machine according to claim 25 in which said carcasses are mounted manually upon said conveyor by an operator and said control means for said power means also being manually operable and requiring manipulation by the hands of an operator to place the operator's hands in a safe position with respect to said machine and the operation thereof.

27. The machine according to claim 24 further including arms supported for pivotal movement in planes parallel to the path of said one span of said conveyor at opposite sides thereof and adjacent said second knife means, said arms being fixed respectively to shafts parallel to said planes, said second knife means comprising a pair of blades secured respectively to the ends of said arms, and drive means operable to oscillate said shafts to move said blades to sever said joints with a slicing cut between said wing sections and stub on the opposite sides of said carcasses.

28. The machine according to claim 24 further including oscillating shafts mounted below said path of movement of said carcasses, arms extending angularly upward from said shafts, said third knife means comprising knife blades projecting upward from said arms to position said blade in the line of movement of the tendons of said extended wing stubs at opposite sides of said carcasses and operable to sever said tendons to effect said aforementioned separation of the balls of said stubs from the sockets therefor in said vertebrae.

29. The machine according to claim 28 further including operating means connected to said oscillating shafts and operable to move the same in directions respectively to move said arms and knives outwardly from the opposite sides of said carcasses as the same move past said knives to permit the saddles of said carcasses to pass therebetween and said operating means then being operable quickly to restore said blades to positions closely adjacent the opposite sides of said carcasses and thereby cut said tendon between said wing stubs and vertebrae.

30. The machine according to claim 24 further including a shaft extending transversely to said path of movement for said carcasses and above said one span of said conveyor adjacent said second and third knife means, a plurality of sets of multiple arms projecting from said shaft respectively adjacent the opposite sides of said path, said sets of multiple arms respectively comprising a first arm positioned to engage sections of said wings and move the same into position for said second knife means to cut said wing sections from said wing stubs, and a second arm positioned and adapted to hold the skin between said wing sections and stubs in the path of movement of said second knife means to insure severance thereof thereby.

31. The machine according to claim 30 in which said guide rods comprise pairs of parallel guide rods positioned respectively along opposite sides of said path of movement of said carcasses and spaced apart a limited distance to slidably receive wing stubs therebetween adjacent the outer ends of said stubs and support said stubs in extended manner to tension the tendon thereof which connects said stubs to said vertebrae and position said tendons for engagement by said third knife means, said rods of each pair being sufficiently close together to impose a drag upon the outer ends of said stubs and thereby separate the balls of said stubs from the sockets therefor in said vertebrae of said carcasses as said carcasses are impelled along said path, and said sets of multiple arms on said transverse shaft further including a third arm movable by said shaft into engagement with said stubs after separation thereof from said vertebrae and operable to push said separated stubs from between said pairs of guide rods for discharge of said stubs from said machine.

32. The machine according to claim 31 in which said pairs of guide rods terminate a short distance past said third knife means in the direction of movement of said carcasses along said path.

33. The machine according to claim 24 in which said conveyor is provided with elongated support members guided for movement along said path for said carcasses, said support members being extended into said carcasses, and said machine further including clamp means securing one carcass to each support member, and said fourth knife means comprising a pair of spaced knives, and means operable to move said knives transversely to said support members to sever said ribs respectively adjacent opposite sides of the vertebrae of said carcasses.

34. The machine according to claim 33 in which said support members comprise narrow spear-like members having slots extending longitudinally therein and spaced transversely apart similar distances to the spacing of said knives and operable to receive said knives during the severing movement thereof.

35. The machine according to claim 34 further including a pair of auxiliary knife means positioned respectively on opposite sides of said path of movement of said carcasses adjacent and below said fourth knife means, means supporting said knive means for movement inward toward said carcasses to sever breasts from the thighs and other tissue extending therebetween and cooperating with said fourth knife means to sever entire breasts from said carcass portions clamped to said conveyor.

36. The machine according to claim 35 further including a pair of auxiliary stationary knives positioned in opposition to and in alignment with the path of movement of said pair of auxiliary knife means and cooperable therewith when said movable auxiliary knife means are moved inward to effect a shearing relationship therewith to sever said depending breasts from said thighs and other connecting tissues therebetween.

37. The machine according to claim 35 further including means movable adjacent said path of movement of said carcasses and operable to engage said severed breasts and knock the same downward from said path of said carcasses to insure separation of said breasts from said machine.

38. The machine according to claim 24 in which said means to move said connected thighs and legs outward from said vertebrae comprise guide members mounted adjacent said path of movement of said carcasses and positioned to extend in opposite directions from opposite sides of said conveyor immediately beyond said fourth knife means in the direction of movement of said carcasses along said path and said guide means being operable to lift said connected legs and thighs at least partially upward and outward from the initial depending position thereof while said carcasses are advanced by said conveyor to effect sliding movement of said connected legs and thighs along said guide means and thereby extend the tendons between said thighs thereof and said vertebrae of said carcasses as aforesaid to tension said tendons for severance by said fifth knife means.

39. The machine according to claim 38 also including means to engage the outer ends of said connected legs and thighs to stop movement thereof, said means comprising a pair of arms pivotally supported at one end respectively adjacent opposite sides of said path of movement of said carcasses and positioned to engage said partially lifted legs and thighs, power means connected to said one end of each arm and operable to move the outer ends of said arms upward into engagement with said partially lifted legs, stationary guide means vertically aligned with said conveyor above and parallel thereto, and outer portions of said arms when raised upward respectively being adjacent the opposite sides of said stationary guide means to form spaces therebetween through which the outer hock ends of said legs extend with said ends uppermost, thereby to tension said tendons of the ball and socket joints connecting said thighs of the connected legs and thighs to said vertebrae and position said tendons for severance by said fifth knife means.

40. The machine according to claim 39 further including means in said machine engaging said fifth knife means to support the same stationarily in said machine, said knife means comprising blades having cutting edges extending upward and inward toward said conveyor from opposite sides thereof, said cutting edges also sloping rearward toward the discharge end of said conveyor to effect a slicing cut of said tendon between said thighs of the connected legs and thighs and vertebrae of said carcasses.

41. The machine according to claim 39 in which said pair of arms have stop members mounted thereon and positioned to be engaged by said hock ends of said legs as said legs are moved along said spaces between said arms and stationary guide means while being fed by said conveyor for movement of the clamped vertebrae of said carcasses along said path of movement therefor, thereby to arrest movement of said connected legs and thighs while each vertebra continues to move toward the discharge end of said machine and thereby cause the balls of the thigh joints to be separated from the sockets thereof in said vertebrae and also tear said connected thighs and legs from the flesh remaining upon said vertebrae to cause the appended oyster on the innermost end of said thigh also to be removed from said vertebrae with said thighs.

42. The machine according to claim 39 in which said guide means for said legs and thighs comprise plate-like cam members having upper surfaces sloping downward and outward from opposite sides of said conveyor, said cam members being adjacent said pivoted arms and said cam members having slots through which the outer ends of said arms pass when moving upward to raise said legs and thighs for severance of the tendon between said thighs and said vertebrae and separating of the ball and socket joints therebetween.

43. A method of separating dressed poultry carcasses into certain normal commercial components comprising the steps,
1. extending such components from the portion of the carcass to which they are connected by ball and socket joints to tension the connecting tendons of said joints,
2. severing at least the major connecting tendons by which said components are connected to said carcass, and
3. moving said components relative to said portions of the carcass to which they are connected in separative direction, thereby to separate said ball of the joints from the socket therefor to effect separation of said components from the back of said carcass in a manner by which they are free of bone fragments.

44. The method according to claim 43 in which said step of extending said components comprises placing the outer ends of said components under tensile stress by placing a drag upon said components while said carcass is moved along a path by a conveyor.

45. The method according to claim 44 in which said components continue to be subjected to a retarding drag after severance of said tendons while said carcass is advanced positively by force and thereby separate said components from the remainders of said carcasses.

46. The method according to claim 44 in which the components to be separated from the carcasses comprise connected thighs and legs, and said drag placed upon said thighs and legs tears the thighs from the vertebrae and also pulls the oysters appended to said thighs from the vertebrae, thereby salvaging said oysters automatically by said separating function.

47. A machine operable automatically to dismember dressed poultry carcasses into separate components thereof and comprising in combination:
a. a frame having inlet and exit ends,
b. a conveyor supported by said frame and having a span movable along a path between said inlet and exit ends of said frame,
c. a series of elongated support members for poultry carcasses on said conveyor respectively arranged to be inserted longitudinally into poultry carcasses uniformly from one end thereof and directly engaging one surface of the backs of said carcasses,
d. clamping means carried by said conveyor and activated by said conveyor following the mounting of carcasses upon said support members to be moved into engagement with the opposite surface of the back of each carcass in opposition to said support members and thereby firmly clamp said backs of said carcasses between said support members and clamping means during movement of said carcasses from said inlet end of said frame toward said exit end thereof, and
e. carcass disecting means positioned along the path of movement of said span of said conveyor and operable sequentially to separate components of said carcasses from said backs thereof while said backs are clamped as described.

48. The machine according to claim 47 in which said conveyor is endless and flexible, and said machine further including sprocket gears on said frame supporting said conveyor for movement of said one span thereof between said inlet and exit ends of said frame, and guide means for said elongated support members extending longitudinally adjacent said conveyor and operable to maintain said support members in predetermined position relative to said span of said conveyor as the same moves along said path and also being operable to hold the same in clamping opposition to said clamping means.

49. The machine to claim 48 in which said clamping means are elongated members interconnected at regular intervals in said conveyor between flexible sections thereof.

50. The machine according to claim 49 in which said supporting members are spear-like and when the same are moved to said inlet end of said frame the outer ends of said spear-like members project toward said inlet end of said frame in spaced relation to the periphery of said conveyor and sprocket therefor at said inlet end, thereby to be freely in position to have a poultry carcass projected onto said support members when so positioned at said inlet end of said frame.

51. The machine according to claim 50 further including drive means for said conveyor operable to advance the same stepwise incident to operations of said carcass dissecting means upon said carcasses, and said support members being stationary when projecting freely toward said inlet end of said frame to receive a carcass thereon.

52. The machine according to claim 50 in which said spear-like support members are connected to said conveyor adjacent said flexible sections thereof and extending in cantilever manner from said connection thereof with said conveyor, whereby as said support members move around the sprocket gear adjacent said inlet end of said frame said spear-like members will project tangentially relative to said gear and when said spear-like members have a carcass mounted thereon and move past said inlet said spear-like support members are moved into substantially parallel relation with and in opposition to one of said elongated clamping members of said conveyor and thereby automatically clamp each carcass firmly between said opposed support and clamping members.

53. The machine according to claim 52 in which said spear-like cantilever support members have guide followers thereon extending oppositely therefrom and engagable with said guide means to hold said spear-like support members in said opposition to said clamping members when being moved along said path by said conveyor.

54. The machine according to claim 47 in which at least said support members or clamping means have projections thereon which project into the backs of poultry carcasses when clamped between said members and means.

55. The machine according to claim 54 in which both said support members and clamping means have projections thereon respectively to project in opposite surfaces of the backs of said carcasses.

* * * * *